US012775805B2

(12) United States Patent
Rama Chandra Murty Nallam

(10) Patent No.: US 12,775,805 B2
(45) Date of Patent: Oct. 27, 2026

(54) SYSTEM AND METHOD FOR MULTI-MODAL AI CONVERSATIONAL INTERFACE IMPROVING WEBSITE NAVIGATION AND USER INTERACTION

(71) Applicant: Sree Rama Chandra Murty Nallam, Frisco, TX (US)

(72) Inventor: Sree Rama Chandra Murty Nallam, Frisco, TX (US)

(73) Assignees: Seanergy Digital Inc., Plano, TX (US); SREE RAMA CHANDRA MURTY NALLAM, Frisco, TX (US)

( * ) Notice: Subject to any disclaimer, the term of this patent is extended or adjusted under 35 U.S.C. 154(b) by 0 days.

(21) Appl. No.: 19/314,555

(22) Filed: Aug. 29, 2025

(65) Prior Publication Data

US 2025/0384216 A1 Dec. 18, 2025

(51) Int. Cl.
*G06F 40/35* (2020.01)
*G06F 40/103* (2020.01)
(Continued)

(52) U.S. Cl.
CPC ............ *G06F 40/35* (2020.01); *G06F 40/103* (2020.01); *G06F 40/289* (2020.01); *G06F 40/40* (2020.01); *G06T 13/205* (2013.01); *G06T 13/40* (2013.01); *G10L 13/027* (2013.01); *G10L 13/033* (2013.01); *G10L 13/06* (2013.01); *G11B 27/10* (2013.01)

(58) Field of Classification Search
CPC ...... G06F 40/35; G06F 40/103; G06F 40/289; G06F 40/40; G06T 13/205; G06T 13/40; G10L 13/027; G10L 13/033; G10L 13/06; G11B 27/10
USPC ........................................................ 715/202
See application file for complete search history.

(56) References Cited

U.S. PATENT DOCUMENTS

2013/0262107 A1* 10/2013 Bernard .............. G06F 16/3329 704/235
2018/0052885 A1* 2/2018 Gaskill ................ G06F 16/243
(Continued)

*Primary Examiner* — Stephen S Hong
*Assistant Examiner* — Ahamed I Nazar
(74) *Attorney, Agent, or Firm* — Novel Patent Services LLC

(57) ABSTRACT

The present invention relates to a system for transforming static websites into artificial intelligence (AI)-enabled interactive multi-modal conversational platforms. The system comprises a computing device having a processor for receiving user queries as text or speech input through an input module cooperating with a speech-to-text module. A natural language processing (NLP) module interprets intent, classifies user context, and retrieves grounded information from multiple webpages. A persona adaptation module dynamically modifies vocabulary, tone, and avatar representation across roles such as sales assistant, recruiter, educator, healthcare professional, etc. A response generator module produces structured natural language output, transmitted to a text-to-speech synthesis module and an avatar generation module to render synchronized lifelike video responses. An output rendering module displays multi-modal responses include text, audio, and video, thereby enabling direct navigation and escalation beyond limitations of conventional static websites.

19 Claims, 8 Drawing Sheets

(51) Int. Cl.

| | |
|---|---|
| ***G06F 40/289*** | (2020.01) |
| ***G06F 40/40*** | (2020.01) |
| ***G06T 13/20*** | (2011.01) |
| ***G06T 13/40*** | (2011.01) |
| ***G10L 13/027*** | (2013.01) |
| ***G10L 13/033*** | (2013.01) |
| ***G10L 13/06*** | (2013.01) |
| ***G11B 27/10*** | (2006.01) |

(56) References Cited

U.S. PATENT DOCUMENTS

| | | | | |
|---|---|---|---|---|
| 2019/0354594 | A1* | 11/2019 | Foster | G06F 16/3329 |
| 2023/0343324 | A1* | 10/2023 | Baeuml | G10L 13/10 |
| 2026/0171263 | A1* | 6/2026 | Stanojevic | G06V 40/10 |

* cited by examiner

SYSTEM AND METHOD FOR MULTI-MODAL AI CONVERSATIONAL INTERFACE IMPROVING WEBSITE NAVIGATION AND USER INTERACTION

FIELD OF THE INVENTION

The present disclosure relates generally to artificial intelligence (AI)-enabled interactive communication technologies, and more particularly to a system and method for transforming static websites into multi-modal conversational platforms that enhance user interaction, navigation, and information accessibility through adaptive persona-driven engagement.

BACKGROUND

Rapid growth of artificial intelligence (AI) and natural language technologies has significantly transformed the way users interact with digital platforms. Modern users increasingly expect seamless, intuitive, and human-like engagement when accessing information online. Despite these advancements, most websites continue to rely on static layouts and limited interaction models, which do not fully exploit the capabilities of emerging AI-driven communication technologies.

Traditional websites are predominantly designed as static interfaces that rely on hierarchical menus, hyperlinks, and rigid navigation structures. While such layouts provide access to information, they often require users to browse multiple pages or menus before reaching their desired content, leading to inefficiencies in usability and engagement. To address these inefficiencies, conversational agents and chatbots have been integrated into websites as supplemental tools for guiding users. However, most existing chatbots operate within text-only environments, offering limited functionality and lacking dynamic adaptability. They often rely on predefined scripts or static decision trees, thereby restricting their ability to respond to diverse and contextually rich user queries.

Prior attempts in the field of conversational interfaces, such as those disclosed in U.S. Patent Application Publication No. US20190354594A1, describe frameworks that enable intelligent virtual assistants to interact with users across multiple platforms. While such systems establish useful dialogue management and context handling, they primarily focus on backend processing workflows. They do not address the transformation of static websites into immersive, multi-modal conversational environments that incorporate adaptive personas and real-time multimedia interaction.

Similarly, U.S. Pat. No. 8,090,583B1 discloses technologies related to generating interactive avatars and providing virtual representations for users. While this invention contributes to avatar visualization, it is primarily directed toward graphical rendering and user representation rather than enhancing web-based navigation and interaction. The disclosure does not provide mechanisms for integrating avatars into website workflows to facilitate adaptive, multi-modal conversation tailored to diverse user intents.

The limitations of these prior solutions are significant. Conventional chatbots and intelligent assistants often lack the ability to integrate seamlessly into a website's navigation framework, restricting their role to superficial Q&A functions. They do not dynamically adapt personas according to context, such as switching between a sales assistant, a recruiter, an educator, nor do they deliver synchronized responses across text, audio, and video formats.

Furthermore, existing avatar technologies emphasize visual aesthetics rather than their role in improving website usability. While they provide lifelike interaction in isolated contexts, they fail to leverage conversational intelligence for retrieving, combining, and presenting information directly from different portions of a website in response to natural user queries. These limitations result in user experiences that remain fragmented, requiring repeated navigation through traditional menus or reliance on limited chatbot responses. Such interactions not only diminish efficiency but also prevent websites from becoming fully interactive platforms that anticipate and adapt to user needs in real time.

In view of these shortcomings, there remains a need for a system and method that transforms static websites into adaptive conversational platforms. The inventive objective of the present disclosure is to deliver a unified, multi-modal communication experience that integrates persona adaptation, contextual knowledge retrieval, and synchronized outputs across text, voice, and video, thereby overcoming the inefficiencies and limitations of prior art.

To address the aforementioned limitations, there is a need for a system that transforms static websites into adaptive conversational platforms capable of delivering multi-modal interaction for enhancing user interaction, navigation, and information accessibility through adaptive persona-driven engagement. There is also a need for a system that integrates artificial intelligence (AI)-driven, knowledge retrieval, and persona adaptation to generate contextually appropriate responses aligned with user intent. There is also a need for a system that produces synchronized outputs across text, speech, and lifelike video avatars, thereby creating a more natural and engaging user experience. Furthermore, there is a need for a system that allows seamless integration with existing websites, enabling conversational queries to trigger direct navigation, information retrieval, and dynamic content presentation. There is also a need for a system that provides automated escalation mechanisms, including follow-up communications and referral to appropriate personnel, in cases where user queries cannot be fully resolved. Collectively, such a system should improve technical efficiency, enhance user engagement, reduce reliance on static menus, and enable websites to operate as intelligent, adaptive, and interactive platforms.

SUMMARY OF THE INVENTION

The following presents a simplified summary of one or more embodiments of the present disclosure to provide a basic understanding of such embodiments. This summary is not an extensive overview of all contemplated embodiments and is intended to neither identify key nor critical elements of all embodiments nor delineate the scope of any or all embodiments.

The present disclosure, in one or more embodiments, relates to a system and method for transforming static websites into multi-modal conversational platforms that enhance user interaction, navigation, and information accessibility through adaptive persona-driven engagement.

In one embodiment herein, the system comprises a computing device having a processor and a memory configured to store one or more instructions executable by the processor. In one embodiment herein, the computing device is in communication with the server and the database of verified sources via the network. The processor is configured to receive user input data and generate adaptive multi-modal responses.

In one embodiment herein, the processor is configured to receive one or more user queries by an input module via a user interface. The input module is configured to accept at least one of text data i.e., text inputs and speech data i.e., audio inputs. The input module is configured to cooperate with a speech-to-text module to preprocess the speech data by performing normalization, segmentation, and transcription into text to improve recognition accuracy.

In one embodiment herein, the processor is configured to analyze the received text-based query by a natural language processing (NLP) module to interpret intent, classify user context, and identify relevant website information. The NLP module is configured to semantically retrieve and combine information from multiple webpages within the website to construct a contextually grounded response.

In one embodiment herein, the processor is configured to adapt conversational interaction by a persona adaptation module based on the classified contextually grounded response by dynamically modifying vocabulary, tone, speech style, and avatar representation. In one embodiment herein, the persona adaptation module is operable to switch among multiple roles, which include, but not limited to, a sales assistant, a recruiter, an educator, a healthcare professional, a financial advisor persona, a customer support persona, a legal advisor persona, a technical support persona, a government service agent persona, an e-commerce shopping guide persona, an entertainment/media host persona, and a compliance trainer persona in response to the identified user context. In one embodiment herein, the processor is configured to generate a structured natural language output by a response generator module using an LLM. The response generator module is configured to produce structured outputs as text data and transmits the text data to a text-to-speech synthesis module to generate spoken audio output while exporting phoneme alignment data.

In one embodiment herein, the processor is configured to generate synchronized video output using an avatar generation module based on the phoneme alignment data. The avatar generation module produces a lifelike video of an animated persona delivering the generated spoken audio output in synchrony with lip movements and gestures and renders generated outputs through an output rendering module integrated into the user interface. The output rendering module is configured to display responses in multi-modal formats, which include, but not limited to, a text transcript, an audio playback, and an embedded avatar video within the user's browser environment.

In one embodiment herein, the processor is configured to replace a static homepage with an interactive conversation window integrated into the user interface. The processor is configured to enable conversational queries to directly trigger navigation by displaying or linking to relevant webpages within the website, which includes, but not limited to, at least one of the case studies, product descriptions, application forms, service catalogs, pricing pages, user manuals, knowledge-base articles, policy documents, FAQs, training modules, multimedia content pages, customer testimonials, blog posts, career pages, and contact and support pages.

In one embodiment herein, the processor is configured to execute an escalation module when a query cannot be resolved. The escalation module is configured to automatically generate and transmit a follow-up email to the user containing additional information or clarifications and to initiate further interaction by either connecting the user with designated management personnel or providing corresponding contact details through the conversation window.

In one embodiment herein, the processor is configured to normalize heterogeneous content formats comprising HTML, PDF, and Markdown into structured text for uniform processing. In one embodiment herein, the processor is configured to perform content cleaning operations, which include, but not limited to, personal identifiable information (PII) scrubbing, track text changes, and metadata enrichment prior to indexing. In one embodiment herein, the processor is configured to segment normalized content into metadata-tagged chunks. The metadata-tagged chunks comprise at least one of a source, tags, or persona visibility. In one embodiment herein, the processor is configured to generate vector embeddings of the segmented content using a semantic embedding model and index the embeddings for retrieval-augmented generation (RAG). In one embodiment herein, the processor is configured to enforce compliance policies by recording user consent, masking sensitive data in logs, and automatically purging stored content after a configurable retention period. In one embodiment herein, the processor is configured to capture runtime telemetry, which includes, but not limited to, chat transcripts, audio or voice metrics, and frontend user events for performance and usage analytics.

In one embodiment herein, the processor is configured to transmit telemetry data into an analytics pipeline, which includes, but not limited to, log aggregation, application insights, and data transformation modules for funnel and cohort analysis. In one embodiment herein, the processor is configured to perform quality review operations, which include, but not limited to, transcript analysis, user feedback scoring, and automated benchmarking of response accuracy to update prompting strategies. In one embodiment herein, the processor is configured to integrate with enterprise platforms, which include, but not limited to, customer relationship management (CRM), enterprise resource planning (ERP), electronic health record (EHR/HL7), IT service management (ITSM), and geolocation services.

In one embodiment herein, the processor is configured to dynamically adapt compliance rules, persona selection, and conversational tone based on detected user domain, which may include, but not limited to, healthcare, recruitment, customer service, education, financial services, e-commerce, legal advisory, government services, technical support, industrial operations, and entertainment, and thereof. In one embodiment herein, the processor is configured to orchestrate secure operations using identity management, secrets vault, and feature flagging for enabling or disabling selected conversational capabilities. In one embodiment herein, the processor is configured to maintain an event bus for orchestrating asynchronous communication between the speech-to-text module, the natural language processing module, the text-to-speech module, and the avatar generation module. The system transforms a static website into an adaptive conversational platform by enabling natural language queries to directly trigger retrieval, navigation, and presentation of relevant website information, thereby overcoming limitations of conventional static menus and scripted chatbot systems.

According to one aspect, a method is disclosed for transforming a static website into an artificial intelligence (AI)-enabled multi-modal conversational agent using the system. First, at one step, the input module of the conversation window executing on the user device receives one or more user queries as at least one of the text inputs and the audio inputs, thereby pre-processing the audio input by the speech-to-text module by normalizing, segmenting, and transcribing it into text to improve recognition accuracy. The speech-to-text module is configured to transcribe audio input into text and generate phoneme alignment data for synchronizing avatar lip, facial, and gesture movements during video rendering.

At another step, the natural language processing (NLP) module analyzes the typed or transcribed text to determine user intent, classify user context, and identify relevant website information, thereby semantically retrieving and combining the grounded passages from the multiple webpages of the website to construct the contextually grounded response. The grounded passages are retrieved by performing a semantic similarity search across multiple webpages of the website and merged into a unified response dataset.

At another step, the persona adaptation module adapts conversational interaction based on the classified context by dynamically modifying at least one of the vocabulary, tone, speech style, and avatar representation, thereby switching among multiple roles. The persona adaptation module is configured to select the conversational persona from plurality of roles comprises at least one of, but not limited to, the sales assistant persona, the recruiter persona, the teacher persona, the healthcare assistant persona, a financial advisor persona, a customer support persona, a legal advisor persona, a technical support persona, a government service agent persona, an e-commerce shopping guide persona, an entertainment/media host persona, and a compliance trainer persona.

At another step, the response generator module generates structured natural-language output and transmits the structured natural-language output to the text-to-speech (TTS) synthesis module to generate spoken audio while exporting phoneme alignment data. The response generator module is configured to produce navigation actions that link the user directly to specific website sections, which include, but not limited to, the case studies, product descriptions, or job postings.

At another step, the avatar generation module renders the synchronized lifelike video of an animated persona delivering the spoken audio output in synchrony with lip movements and gestures based on the phoneme alignment data. The avatar generation module is configured to apply phoneme-to-viseme mapping to animate lip, facial, and gesture movements of the avatar synchronously with the generated audio.

At another step, the output rendering module displays the generated response in multi-modal formats, which include, but not limited to, the text transcript, the audio playback, and the embedded avatar video within the user's browser environment. The output rendering module is configured to simultaneously display the natural-language answer as text and play back the synchronized avatar video in a split-screen conversation window. The output rendering module is configured to replace the homepage dynamically without reloading the entire website and preserves access to the classic website via a persistent hyperlink. At another step, the static homepage is replaced with the conversation window while providing direct navigation by linking to webpages, which include, but not limited to, case studies, product descriptions, application forms, service catalogs, pricing pages, user manuals, knowledge-base articles, policy documents, FAQs, training modules, multimedia content pages, customer testimonials, blog posts, career pages, and contact and support pages.

Further at other step, the escalation module executes the follow-up procedure when the query cannot be resolved, thereby generating the follow-up email to the user and selectively connecting the user with designated management personnel or providing corresponding contact details. The escalation module is configured to transmit follow-up emails through an automated mail server and logs unresolved queries in a management dashboard for review by designated personnel. The escalation module provides real-time connection to the designated personnel through at least one of chat forwarding, voice call initiation, or calendar-based appointment scheduling.

In another exemplary embodiment, a non-transitory computer-readable medium stores instructions that, when executed by the processor, cause the processor to perform a method for transforming a static website into an artificial intelligence (AI)-enabled multi-modal conversational agent using the system. Initially, the processor is configured to receive the one or more user queries through the conversation window executing on the user device as at least one of the text inputs and the audio inputs, thereby pre-processing the audio input by performing normalizing, segmenting, and transcribing into text to improve recognition accuracy.

Next, the processor is configured to analyze the typed or transcribed text to determine user intent, classify user context, and identify relevant website information, thereby semantically retrieving and combining the grounded passages from the multiple webpages of the website to construct the contextually grounded response. Next, the processor is configured to adapt the conversational interaction based on the classified context by dynamically modifying at least one of the vocabulary, tone, speech style, and avatar representation, thereby switching among multiple roles. Next, the processor is configured to generate the structured natural-language output and transmit the structured natural-language output to generate the spoken audio while exporting phoneme alignment data. Next, the processor is configured to render the synchronized lifelike video of the animated persona delivering the spoken audio output in synchrony with lip movements and gestures based on the phoneme alignment data.

Next, the processor is configured to display the generated response in multi-modal formats, which include, but not limited to, the text transcript, audio playback, and the embedded avatar video within the user's browser environment. Next, the processor is configured to replace the static homepage with the conversation window while providing direct navigation by linking to webpages, which include, but not limited to, the case studies, the product descriptions, the application forms, service catalogs, pricing pages, user manuals, knowledge-base articles, policy documents, FAQs, training modules, multimedia content pages, customer testimonials, blog posts, career pages, and contact and support pages. Finally, the processor is configured to execute the follow-up procedure when the query cannot be resolved, thereby generating the follow-up email to the user and selectively connecting the user with designated management personnel or providing corresponding contact details While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

The accompanying drawings, which are incorporated in and constitute a part of the specification, illustrate an embodiment of the invention, and, together with the description, explain the principles of the invention.

DETAILED DESCRIPTION

Figure 1:
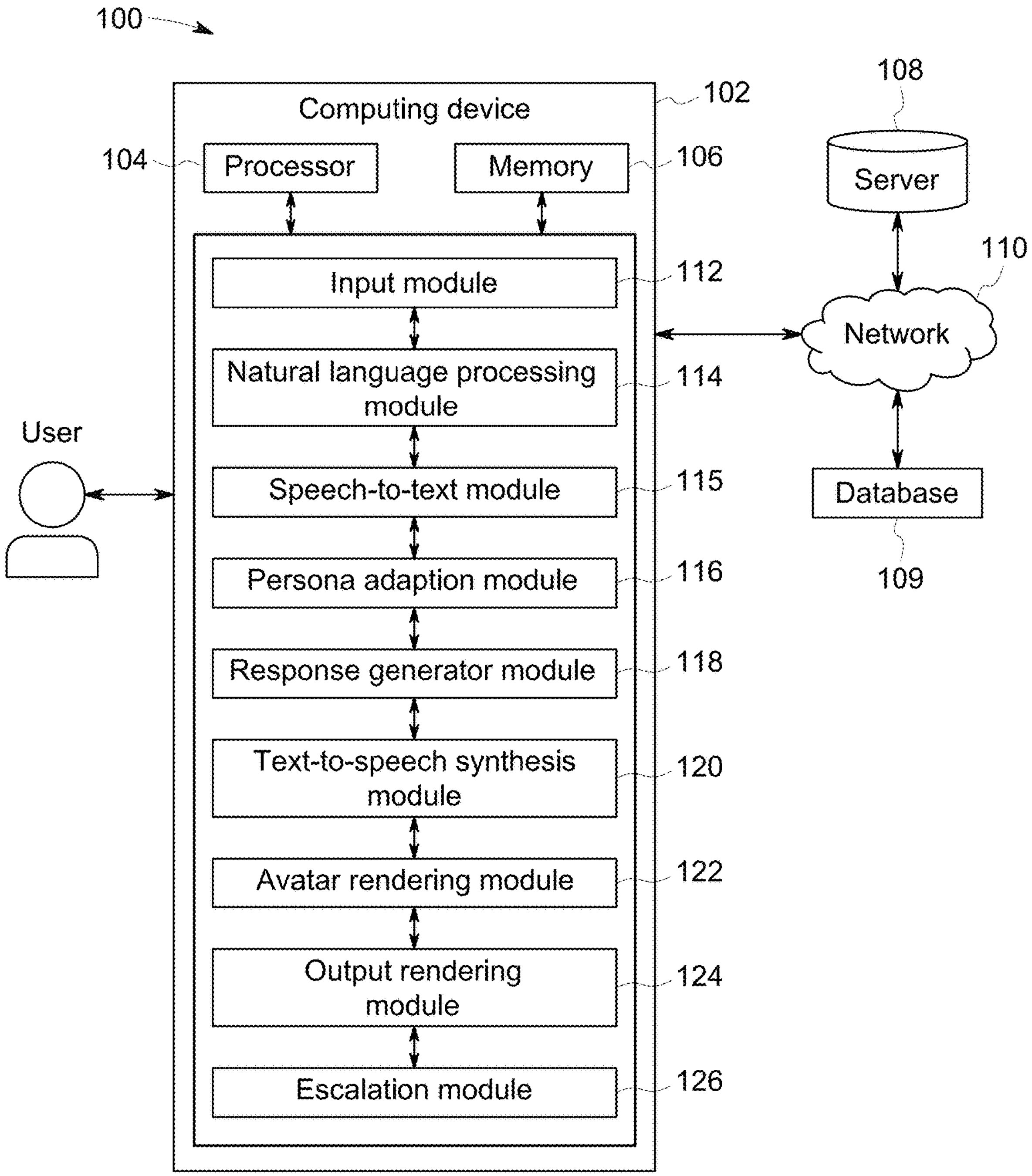
FIG. 1 illustrates a block diagram of a system for transforming static websites into multi-modal artificial intelligence (AI) conversational platforms, in accordance with embodiments of the invention.

Reference will now be made in detail to the present preferred embodiments of the invention, examples of which are illustrated in the accompanying drawings. Wherever possible, the same reference numerals are used in the drawings and the description to refer to the same or like parts.

FIG. 1 refers to a block diagram of a system 100 for transforming static websites into multi-modal artificial intelligence (AI) conversational platforms that enhance user interaction, navigation, and information accessibility through adaptive persona-driven engagement. In one embodiment herein, the system 100 comprises a computing device 102 having a processor 104 and a memory 106, which stores one or more instructions executable by the processor 104. These instructions may be executed to cause the system 100 to perform the various functionalities. The processor 104 acts as the central processing unit (CPU) of the system 100, responsible for coordinating different tasks and carrying out complex operations, data processing, and decision-making by fetching instructions from the memory 106, thereby decoding the instructions and executing the necessary actions.

In one embodiment herein, the memory 106 serves as the storage component of the system 100, holding the executable instructions, as well as any data or information required by the processor 104 to perform its tasks. The data includes, but not limited to, user inputs, system configurations, and any other relevant data needed for the system's operations. Through the communication between the processor 104 and the memory 106, the system 100 is able to process the user inputs, access stored information, perform computations, and make decisions accordingly.

In one embodiment herein, the computing device 102 represents any electronic device that the user can utilize to interact with the system 100. The computing device 102 can be, but is not limited to, a smartphone, a laptop, a tablet, a personal computer, or any other suitable electronic device. The computing device 102 serves as the user's gateway to accessing and interacting with the system 100. The computing device 102 is configured to enable the user and the administrator to engage with the system's functionalities and capabilities through a user interface.

In one embodiment herein, the user interface is a crucial component of the computing device 102, which allows the user and administrator to input commands, receive information, and control the system 100. The user interface can be, but not limited to, a touch screen, a keyboard, a mouse, voice recognition modules, gesture recognition sensors, and virtual reality interfaces. The versatility of the user interface ensures that the users can engage with the system 100 in a manner that is most intuitive and comfortable for the users, thereby catering to a wide range of user preferences and accessibility needs. The computing device 102 empowers the users to interact with the system 100 seamlessly and efficiently by providing multiple user interface options, thereby leveraging the most appropriate input and output modalities for their specific needs and preferences.

In one embodiment herein, the computing device 102 is in communication with a server 108 and a database 109 via a network 110. The network 110 acts as a communication that allows the computing device 102 to interact with the other components of the system 100, thereby facilitating the exchange of data, commands, and information. In one embodiment herein, the network 110 can be a wireless communication infrastructure, which offers the users flexibility and convenience when interacting with the system 100. This wireless connectivity enables the users to access the system 100 from various locations, without being tethered to a fixed physical connection.

In one embodiment herein, the network 110 can be, but is not limited to, a Local Area Network (LAN), Cellular Network, Wide Area Network (WAN), Intranet, Virtual Private Network (VPN), and wireless networks that use radio frequency (RF) or infrared (IR) technology to transmit data without the need for physical cables, thereby providing mobility and flexibility. The versatility of the network 110 ensures that the computing device 102 can seamlessly connect to the server 108 and the database 109, thereby enabling the users to access the functionalities and resources of the system 100 from a variety of locations and devices. This wireless connectivity enhances the overall accessibility and convenience of the system 100 for the users.

In one embodiment herein, the computing device 102 comprises the processor 104 and the memory 106 configured to store one or more instructions executable by the processor 104. In one embodiment herein, the computing device 102 is in communication with the server 108 and the database 109 of verified sources via the network 110. The processor 104 is configured to receive user input data and generate adaptive multi-modal responses. In one embodiment herein, the processor 104 is configured to receive one or more user queries by an input module 112 via a user interface. The input module 112 is configured to accept at least one of text data i.e., text inputs and speech data i.e., audio inputs. The input module 112 is configured to cooperate with a speech-to-text module 115 to preprocess the speech data by performing normalization, segmentation, and transcription into text to improve recognition accuracy.

In one embodiment herein, the processor 104 is configured to analyze the received text-based query by a natural language processing (NLP) module 114 to interpret intent, classify user context, and identify relevant website information. The NLP module 114 is configured to semantically retrieve and combine information from multiple webpages within the website to construct a contextually grounded response. In one embodiment herein, the processor 104 is configured to adapt conversational interaction by a persona adaptation module 116 based on the classified contextually grounded response by dynamically modifying vocabulary, tone, speech style, and avatar representation. In one embodiment herein, the persona adaptation module 116 is operable to switch among multiple roles, which include, but not limited to, a sales assistant, a recruiter, an educator, a healthcare professional, a financial advisor persona, a customer support persona, a legal advisor persona, a technical support persona, a government service agent persona, an e-commerce shopping guide persona, an entertainment/media host persona, and a compliance trainer persona in response to the identified user context. In one embodiment herein, the processor 104 is configured to generate a structured natural language output by a response generator module 118. The response generator module 118 is configured to produce structured outputs as text data and transmits the text data to a text-to-speech synthesis module 120 to generate spoken audio output while exporting phoneme alignment data.

In one embodiment herein, the processor 104 is configured to generate synchronized video output using an avatar generation module 122 based on the phoneme alignment data. The avatar generation module 122 produces a lifelike video of an animated persona delivering the generated spoken audio output in synchrony with lip movements and gestures and renders generated outputs through an output rendering module 124 integrated into the user interface. The output rendering module 124 is configured to display responses in multi-modal formats, which include, but not limited to, a text transcript, an audio playback, and an embedded avatar video within the user's browser environment. In one embodiment herein, the processor 104 is configured to replace a static homepage with an interactive conversation window integrated into the user interface. The processor 104 is configured to enable conversational queries to directly trigger navigation by displaying or linking to relevant webpages within the website, which includes, but not limited to, at least one of the case studies, product descriptions, application forms, service catalogs, pricing pages, user manuals, knowledge-base articles, policy documents, FAQs, training modules, multimedia content pages, customer testimonials, blog posts, career pages, and contact and support pages.

In one embodiment herein, the processor 104 is configured to execute an escalation module 126 when a query cannot be resolved. The escalation module 126 is configured to automatically generate and transmit a follow-up email to the user containing additional information or clarifications and to initiate further interaction by either connecting the user with designated management personnel or providing corresponding contact details through the conversation window. In one embodiment herein, the processor 104 is configured to normalize heterogeneous content formats comprises HTML, PDF, and Markdown into structured text for uniform processing. In one embodiment herein, the processor 104 is configured to perform content cleaning operations, which include, but not limited to, personal identifiable information (PII) scrubbing, track text changes, and metadata enrichment prior to indexing.

In one embodiment herein, the processor 104 is configured to segment normalized content into metadata-tagged chunks. The metadata-tagged chunks comprise at least one of a source, tags, or persona visibility. In one embodiment herein, the processor 104 is configured to generate vector embeddings of the segmented content using a semantic embedding model and index the embeddings for retrieval-augmented generation (RAG). In one embodiment herein, the processor 104 is configured to enforce compliance policies by recording user consent, masking sensitive data in logs, and automatically purging stored content after a configurable retention period. In one embodiment herein, the processor 104 is configured to capture runtime telemetry, which includes, but not limited to, chat transcripts, audio or voice metrics, and frontend user events for performance and usage analytics.

In one embodiment herein, the processor 104 is configured to transmit telemetry data into an analytics pipeline, which includes, but not limited to, log aggregation, application insights, and data transformation modules for funnel and cohort analysis. In one embodiment herein, the processor 104 is configured to perform quality review operations, which include transcript analysis, user feedback scoring, and automated benchmarking of response accuracy to update prompting strategies. In one embodiment herein, the processor 104 is configured to integrate with enterprise platforms, which include, but not limited to, customer relationship management (CRM), electronic health record (EHR/HL7), IT service management (ITSM), and geolocation services.

In one embodiment herein, the processor 104 is configured to dynamically adapt compliance rules, persona selection, and conversational tone based on detected user domain, which includes, but not limited to, healthcare, recruitment, or customer service, education, financial services, e-commerce, legal advisory, government services, technical support, industrial operations, and entertainment, and thereof. In one embodiment herein, the processor 104 is configured to orchestrate secure operations using identity management, secrets vault, and feature flagging for enabling or disabling selected conversational capabilities. In one embodiment herein, the processor 104 is configured to maintain an event bus for orchestrating asynchronous communication between the speech-to-text module 115, the natural language processing module 114, the text-to-speech module 120, and the avatar generation module 122. The system 100 transforms a static website into an adaptive conversational platform by enabling natural language queries to directly trigger retrieval, navigation, and presentation of relevant website information, thereby overcoming limitations of conventional static menus and scripted chatbot systems.

In one embodiment, the user interface departs from conventional website navigation by occupying the entire homepage with an immersive conversational layout. An avatar and chat panel are displayed on approximately thirty percent of the screen, while a dynamically generated video panel occupies about seventy percent. This configuration emphasizes video-based grounded responses as the primary navigation mechanism. A persistent option labeled "Use Classic Site" allows users to revert to the traditional page-node navigation whenever they prefer.

In one embodiment, personas in the system 100 are defined as functional roles that correspond to distinct operational objectives. For example, a sales persona retrieves case studies, whitepapers, and product resources and connects these results to follow-up workflows such as calendar booking for demonstrations. A human resources persona retrieves job descriptions, resumes, or organizational bios and links the results to workflows such as resume forwarding to a recruitment mailbox or generating acknowledgment emails. Persona switching therefore changes not only the appearance, voice, or avatar style but also the retrieval filters, tool integrations, and downstream enterprise actions.

In one embodiment, the system 100 comprises an optional social-profile mining capability. With user consent and in compliance with privacy policies, publicly available information such as LinkedIn summaries or professional biographies can be retrieved and semantically indexed to supplement the retrieval results. This capability enriches the grounding of conversations. The mining feature is configurable at the tenant level and is enabled by default with compliance guardrails that prevent unauthorized use of personal information.

In one embodiment, the system 100 supports an automatic meeting-slot negotiation module. The conversational agent is able to check the calendar availability of both the requesting party and the enterprise user, propose candidate time slots, handle conflicts by suggesting alternatives, and confirm bookings in real time. This capability introduces an actionable scheduling feature that goes beyond existing conversational systems.

In one embodiment, the system 100 provides a citation overlay mode for video responses. Each fact spoken by the generated avatar can be displayed with source annotations or citation markers that link back to the underlying retrieved knowledge passages. Users are able to toggle this overlay on or off during video playback, which increases transparency and allows the responses to be audited.

In one embodiment, the system 100 is not limited to the transformation of conventional static webpages into conversational interfaces. The system 100 is further adaptable for operation within a plurality of digital environments including, but not limited to, single-page applications (SPAs), enterprise intranets, mobile software applications, interactive kiosks, and immersive computing platforms such as augmented reality (AR) and virtual reality (VR) systems. Furthermore, the system 100 is not restricted to specific industry verticals such as, but not limited to, healthcare, sales, human resources, education, financial services, e-commerce, legal advisory, government services, technical support, industrial operations, entertainment, and thereof. The system 100 is architected as a generalized, multi-modal conversational framework configured for domain-specific persona adaptation and contextual knowledge integration across sectors including, but not limited to, education, financial services, e-commerce, customer support, entertainment, and government portals.

For example, in an educational context, the persona adaptation module 116 may configure the conversational assistant as a teacher persona capable of delivering lecture-style explanations, administering interactive quizzes, and providing video-based demonstrations synchronized with avatar narration, thereby creating an immersive e-learning environment. In financial services, the persona adaptation module 116 may configure the assistant as a finance persona capable of guiding users through regulatory forms, explaining policy documents, and presenting contextual videos to improve investment literacy and compliance awareness. In government or public service domains, the persona adaptation module 116 may configure the assistant as a citizen service persona that provides step-by-step guidance for completing online procedures while simultaneously displaying supporting visual instructions in real time. Accordingly, the system 100 is designed as a generalized, multi-modal conversational architecture capable of transforming diverse digital interfaces into adaptive, persona-driven platforms that enhance user interaction, navigation, and information accessibility across a wide spectrum of industries and use cases.

In another embodiment herein, the system 100 may also be utilized to provide training and skill development for students beyond the conventional education sector. Using the persona adaptation module 116, the conversational assistant can be configured as a domain-specific trainer persona for diverse fields such as, but not limited to, corporate onboarding, technical certification, compliance training, vocational skill enhancement, and professional development programs. The trainer persona may deliver interactive tutorials, scenario-based simulations, assessments, and feedback sessions in multi-modal formats that combine text, speech, and avatar-guided video demonstrations. Beyond training, the persona adaptation module 116 may further configure specialized personas for applications such as, but not limited to, customer onboarding in enterprises, patient education in healthcare, workforce upskilling in manufacturing, and safety drills in industrial environments, thereby extending the applicability of the system 100 across multiple knowledge-transfer and capacity-building contexts.

Figure 2A:
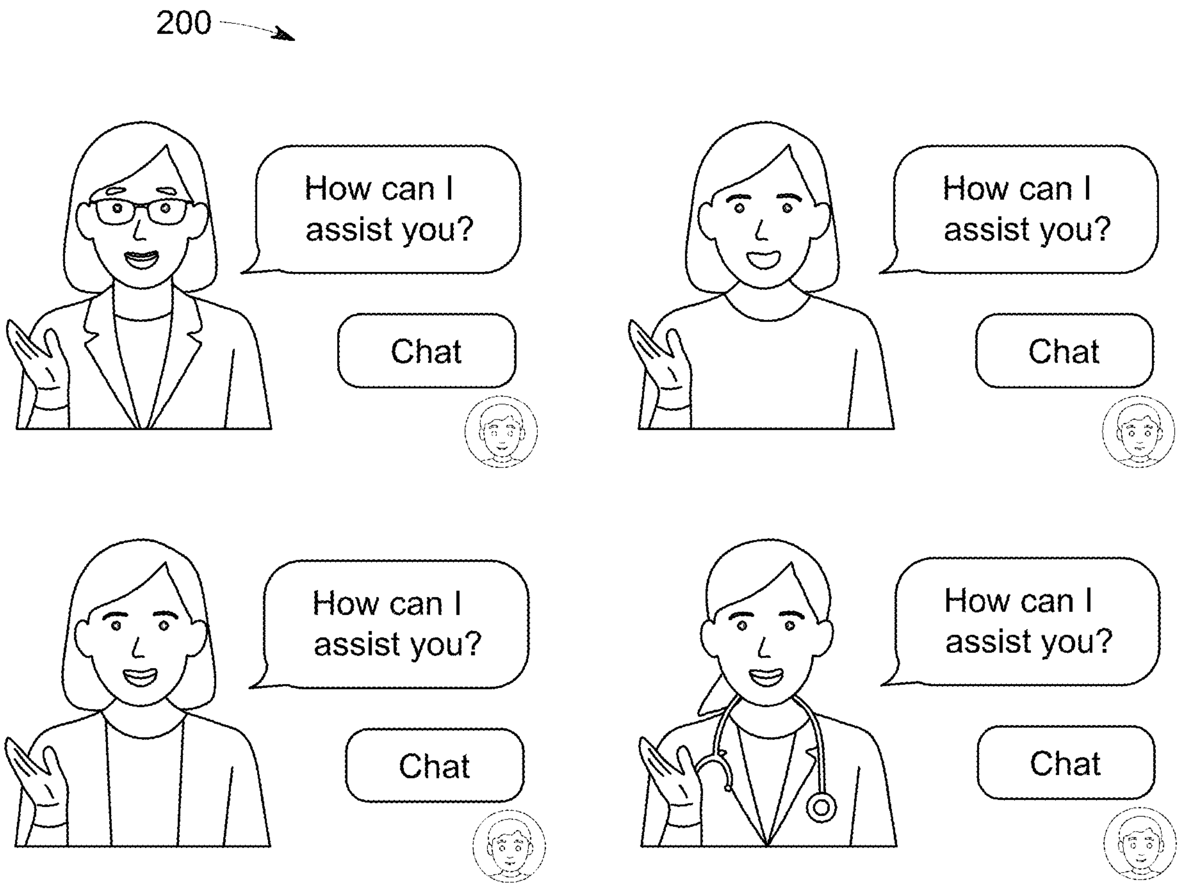
FIG. 2A illustrates a schematic diagram depicting a set of AI-driven conversational personas with animated hand gestures integrated into a chat interface for assisting users, in accordance with embodiments of the invention.

FIG. 2A refers to a schematic diagram 200 depicting a set of AI-driven conversational personas with animated hand gestures integrated into a chat interface for assisting users. Each persona is configured with synchronized lip, facial, and hand gesture animations generated by the avatar generation module 122 based on the phoneme alignment data exported from the text-to-speech synthesis module 120. The animated hand gestures are dynamically synchronized with semantic emphasis detected in the spoken output, thereby improving engagement and naturalism of the conversation.

In one embodiment herein, the user or chat interface cooperates with the input module 112 to receive user queries as at least one of the text inputs and the audio inputs. When speech input is provided, the input module 112 transmits audio signals to the speech-to-text module 115, which performs normalization, segmentation, and transcription of the spoken content into text to improve recognition accuracy. The transcribed query is further analyzed by the natural language processing (NLP) module 114 to determine user intent, classify context, and identify relevant information from webpages or indexed knowledge sources stored in the database 109.

In one embodiment herein, the classified context is transferred to the persona adaptation module 116, which dynamically configures the conversational persona displayed in the user interface. The persona adaptation module 116 modifies vocabulary, tone, and avatar representation parameters, while also enabling domain-specific gesture sets to be rendered by the avatar generation module 122. The conversational interaction is thereby tailored to enhance realism, with gestures complementing spoken intonations and the textual transcript.

Figure 2B:
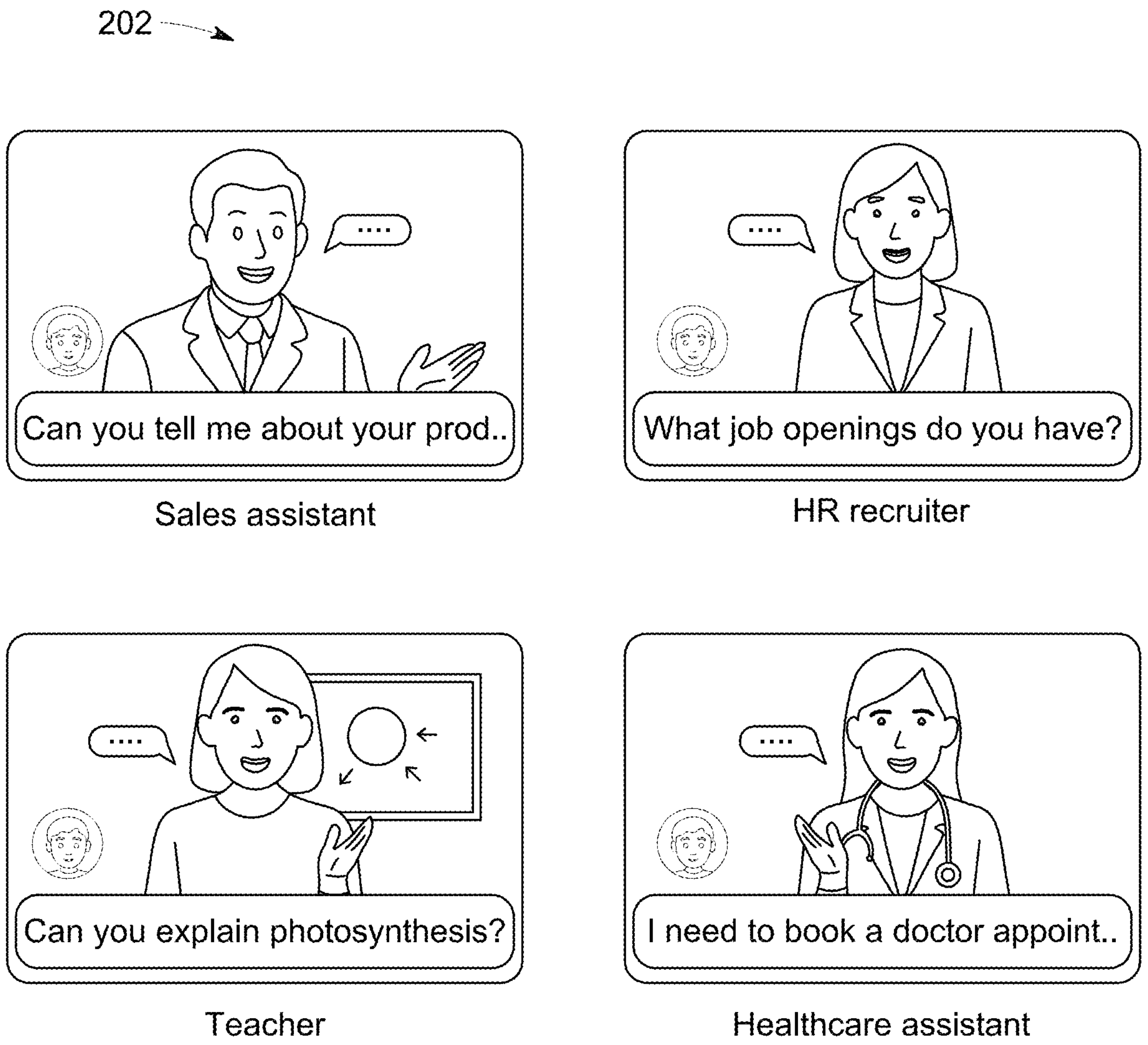
FIG. 2B illustrates a schematic diagram depicting multiple AI conversational roles comprises a sales assistant, HR recruiter, teacher, and healthcare assistant, each adapted to interact with users in domain-specific contexts, in accordance with embodiments of the invention.

FIG. 2B refers to a schematic diagram 202 depicting multiple AI conversational roles comprises, but not limited to, a sales assistant, a HR recruiter, a teacher, a healthcare assistant, a financial advisor persona, a customer support persona, a legal advisor persona, a technical support persona, a government service agent persona, an e-commerce shopping guide persona, an entertainment/media host persona, and a compliance trainer persona each adapted to interact with users in domain-specific contexts. Each persona role is stored as a configurable profile within the persona adaptation module 116 and selected in response to the classified user context provided by the NLP module 114. In one embodiment herein, the sales assistant persona is configured to provide product-related recommendations, link users to case studies, and generate navigation actions to product description pages. The HR recruiter persona is configured to manage application-related queries, schedule interviews, and connect applicants with job postings retrieved by the response generator module 118. The teacher persona is configured to provide learning material summaries, lecture-style explanations, and domain-specific references, while the healthcare assistant persona is configured to provide patient guidance, symptom-check interactions, and links to healthcare resources within the website.

In one embodiment herein, all personas are rendered by the avatar generation module 122 with real-time lip synchronization, hand gestures, and facial expressions, thereby ensuring domain-specific interactions appear lifelike and contextually relevant. The output rendering module 124 displays the multi-modal response within the conversation window, simultaneously presenting the text transcript, the synchronized audio playback, and the animated avatar video of the selected persona role.

Figure 3A:
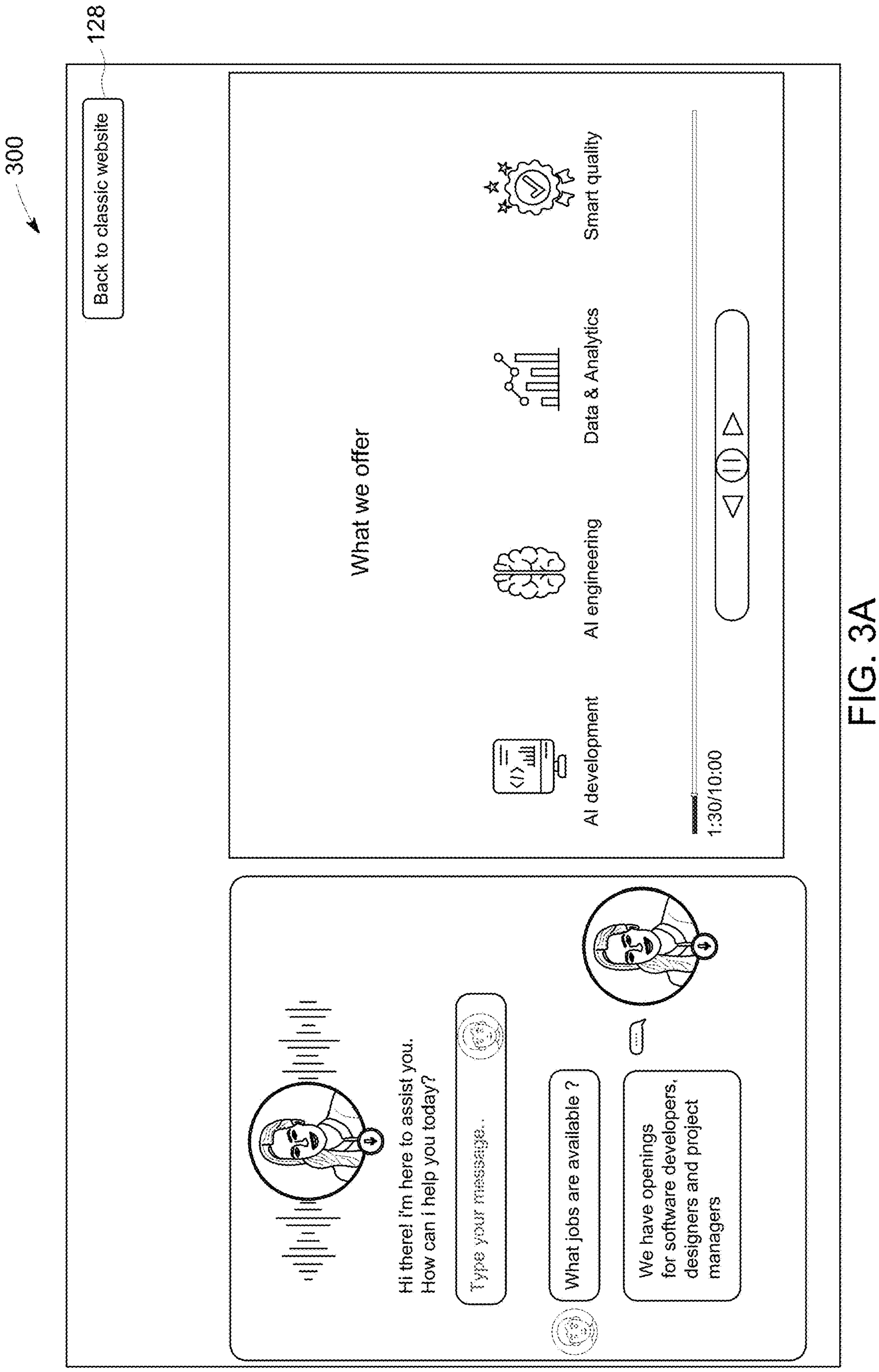
FIG. 3A illustrates a screenshot depicting a dual-panel conversational interface of the system integrating the avatar-based conversation window with a dynamic video presentation panel, in accordance with embodiments of the invention.

FIG. 3A refers to a screenshot 300 a dual-panel conversational interface of the system 100 integrating the avatar-based conversation window with a dynamic video presentation panel. The screenshot 300 illustrates the transformation of a static website homepage into an interactive conversation window configured to initiate multi-modal AI interactions. The interface comprises a centrally displayed animated avatar image surrounded by an audio waveform graphic, which visually indicates readiness to capture user speech input. A microphone icon is overlaid below the avatar image, enabling voice-based query initiation. Beneath the avatar, a selectable button labeled "START A CONVERSATION" is provided, which allows the user to begin interaction with the AI assistant.

In one embodiment herein, the conversational homepage interface dynamically replaces the traditional static navigation model of a website. The interface is configured to cooperate with the input module 112 to receive user input in text or voice mode. The presence of the microphone icon denotes speech interaction capability, whereby user audio is captured and transmitted to the speech-to-text module 115 for normalization, segmentation, and transcription into text. Simultaneously, the "START A CONVERSATION" button allows manual initiation of text-based interaction. The waveform animation is configured to provide real-time visual feedback during speech capture, thereby enhancing user engagement and interaction clarity.

In one embodiment herein, the output rendering module 124 integrates the avatar component at the center of the interface, representing the AI assistant persona. The avatar is selected and adapted by the persona adaptation module 116 based on the classified context of the interaction. In this screenshot 300, the avatar is displayed in a neutral, welcoming pose, configured to greet the user with empathetic expressions. The surrounding layout emphasizes simplicity, with minimal distractions, thereby directing user attention toward initiating the conversation. A toggle option labeled "back to classic website 128" is displayed at the top-right corner of the user interface, thereby enabling the users to revert to conventional menu-driven navigation and ensuring accessibility and user control.

In one embodiment herein, the screenshot 300 exemplifies how the system 100 replaces static website layouts with an immersive, AI-enabled conversation-first interface. By presenting a prominent avatar, animated audio cues, and an intuitive conversation initiation button, the interface reduces navigation friction and encourages users to interact with the AI assistant through natural dialogue rather than manual menu exploration. This design ensures that users are seamlessly guided into the multi-modal interaction workflow of the system 100.

The conversation window could display the animated avatar persona, a microphone input option, and a "START A CONVERSATION" button for initiating interaction. On the right side of the interface, a video/content panel is presented under the heading "What We Offer," highlighting domain-specific service categories such as AI Development, AI Engineering, Data & Analytics, and Smart Quality.

In one embodiment herein, the video panel is rendered by the output rendering module 124 in synchronization with conversational responses generated by the response generator module 118. The system 100 is configured to dynamically replace or overlay static webpage sections with curated video feeds, animations, or service highlights corresponding to the user's query. For example, a query relating to data analytics may directly trigger the panel to present explanatory video content, infographics, or promotional materials drawn from the indexed website database 109.

In one embodiment herein, the video panel operates in coordination with the avatar conversation window. While the avatar on the left delivers spoken responses synchronized with lip and gesture animations, the right-hand panel simultaneously displays supporting videos, contextual navigation, or multimedia content that enriches the user's understanding. This dual-panel design provides an immersive experience by combining conversational AI guidance with visual demonstrations of available services, thereby reducing navigation friction and enhancing engagement. In one e embodiment herein, the back to classic website 128 is configured for enabling users to revert to conventional menu-driven navigation and ensuring accessibility and user control.

In one exemplary embodiment herein, a series of user interactions is carried out with a conversational AI assistant on a recruitment platform. The recruitment assistant is configured to operate as a domain-specific persona role stored in the persona adaptation module 116. The recruitment platform interface cooperates with the input module 112 to receive applicant queries in the form of typed text or spoken audio. The audio input is transcribed into text by the speech-to-text module 115, which normalizes, segments, and aligns the spoken content with phoneme markers to facilitate synchronized avatar rendering.

In one embodiment herein, the NLP module 114 processes the transcribed applicant query to identify intent, extract entities such as "job title," "location," or "experience level," and classify user context as an applicant or recruiter. Based on the classified context, the persona adaptation module 116 configures the AI assistant persona with an HR recruiter role. The recruiter persona dynamically modifies tone and vocabulary to provide professional and supportive responses while displaying avatar gestures that emphasize conversational clarity.

In one embodiment herein, the response generator module 118 produces structured outputs such as answers to eligibility queries, navigation actions linking to job postings, or application form submission pages. The generated text output is transmitted to the text-to-speech synthesis module 120, which produces spoken audio responses while exporting phoneme alignment data. The avatar generation module 122 renders a synchronized recruiter avatar video with coordinated lip movements, facial expressions, and hand gestures. The output rendering module 124 displays the recruiter persona's response as the text transcript, synchronized audio playback, and embedded avatar video, thereby providing applicants with a natural and engaging recruitment experience.

In one exemplary embodiment herein, the system 100 enables a sequence of user interactions carried out with a healthcare conversational AI assistant configured to operate as a domain-specific persona. The healthcare assistant is configured as the domain-specific persona role in the persona adaptation module 116, selected dynamically based on the classified user intent detected by the NLP module 114. In one embodiment herein, the healthcare platform interface cooperates with the input module 112 to receive user queries in text or speech, which may include, but not limited to, symptoms, medication inquiries, or appointment scheduling requests. The speech-to-text module 115 converts audio queries into accurate text by applying normalization and transcription. The NLP module 114 interprets the queries to extract symptom entities, classify urgency, and identify relevant medical information from indexed healthcare content within the database 109.

In one embodiment herein, the persona adaptation module 116 configures the healthcare assistant persona with a tone of empathy, simplified vocabulary, and professional avatar gestures to ensure clarity and comfort during interaction. The response generator module 118 produces structured natural-language outputs such as symptom explanations, links to healthcare resources, or direct navigation to appointment booking pages. The generated text is converted into audio by the text-to-speech module 120, while phoneme alignment data is exported for synchronized avatar rendering.

In one embodiment herein, the avatar generation module 122 renders a lifelike healthcare persona video, synchronizing lip movements, hand gestures, and empathetic facial expressions with the spoken audio. The output rendering module 124 displays the multi-modal response in the healthcare platform interface as the text transcript, audio playback, and avatar video. In scenarios where the user query cannot be resolved, the escalation module 126 initiates a follow-up workflow, which includes, but not limited to, sending a secure follow-up email, logging the unresolved query in a management dashboard, or providing direct contact details of human healthcare personnel.

In one embodiment herein, the system 100 implements a low-latency processing pipeline that captures user input in both text and voice modes. In voice mode, audio is streamed from the browser through a WebRTC channel to a speech-to-text (STT) service. The STT module applies normalization, segmentation, and transcription operations to generate the text transcript, with partial hypotheses streamed to downstream modules for reduced latency. The transcribed or typed query is passed to the NLP module 114, which performs intent recognition, classification of user context, and persona flagging. The NLP output is routed to a retrieval-augmented generation (RAG) orchestrator, which assembles grounding passages from indexed website content. The response is generated by the LLM, transmitted to the TTS synthesis module 120 for audio rendering, and further synchronized with the avatar generation module 122 to produce real-time lip-synced video output. The processed response is delivered back to the browser in multi-modal formats, including chat text, audio playback, and animated avatar video, with overall response latency targeted between 200 and 500 milliseconds.

In one embodiment herein, persona switching is achieved through a hybrid classification mechanism. A rule-based classifier first identifies intent keywords (e.g., "resume," "apply," and "job" trigger recruiter mode; "case study" and "demo" trigger sales mode). In parallel, a machine learning classifier (Azure LUIS or GPT-based model) detects nuanced intents. The persona adaptation module 116 selects the appropriate conversational profile, which includes, but not limited to, persona-specific prompts, retrieval filters, and speech style. Voice modulation is applied using neural TTS with persona-specific voices and prosody parameters. Avatar rendering is dynamically switched between visual personas, thereby ensuring the lip-sync video corresponds to the selected role. This enables real-time persona switching across multiple turns of a single conversation.

In one embodiment herein, the retrieval pipeline ingests heterogeneous content sources comprising static HTML webpages, PDFs, Markdown documents, and API endpoints. A crawler fetches updated content incrementally using ETag/Last-Modified headers. The content is normalized into structured text, with boilerplate elements removed, and segmented into semantic sections with metadata tags including source, timestamp, and persona visibility. A hybrid index is maintained in Azure Cognitive Search, combining keyword (BM25) fields, vector embeddings, and a semantic ranker. Query-time retrieval applies reciprocal rank fusion (RRF) to combine keyword and embedding matches, thereby ensuring diversity and relevance. Retrieved passages are assembled into a grounding pack and supplied to the response generator module 118. This retrieval pipeline ensures recency-aware, contextually grounded responses with reduced hallucinations.

In one embodiment herein, the conversational window integrates into the website either as a full-page overlay replacing the homepage or as a drop-in widget injected by a JavaScript component. The interface comprises a dual-panel layout, including an avatar video window and a chat panel. The system backend transmits structured action messages (e.g., navigate, open resource, play video, book meeting) as JSON objects alongside the natural-language response. The frontend binds these events to navigation handlers, thereby enabling direct routing within single-page applications or external linking to legacy pages. Accessibility is ensured through live captions, ARIA announcements of navigation actions, and persistent access to the classic website interface.

In one embodiment herein, the escalation module 126 executes automated follow-up when a query cannot be resolved. Outbound messages are transmitted through Microsoft Graph API using secure credentials stored in a secrets vault. The system 100 may also integrate with enterprise customer relationship management (CRM) or human resource management systems (HRMS) to log leads or candidate details. Escalation workflows include, but not limited to, automated emails, real-time chat forwarding, or appointment scheduling. All communications are logged with audit trails for compliance and review by designated personnel.

In one embodiment herein, the system provides multiple technical advantages over conventional chatbots and avatar systems. These include, but not limited to, real-time persona switching combining rule-based and AI intent detection, low-latency speech loop achieved through partial STT streaming and token-based LLM output, synchronized multimodal rendering wherein avatar lip, facial, and gesture movements are bound to phoneme alignment data from the TTS output, retrieval freshness through incremental crawling and recency-aware semantic ranking, and enterprise-grade operations with consent capture, GDPR-compliant data retention, and telemetry-driven analytics. Collectively, these improvements provide measurable technical effects in accuracy, latency, and compliance, thereby overcoming limitations of prior scripted chatbot and static avatar solutions.

In one embodiment herein, the system 100 provides multiple client frontends, which include, but not limited to, an agent desktop for live operators, a supervisor console for monitoring and drill-downs, and an admin console for tenancy, skill, policy, and feature configuration; the user desktop receives and renders live transcripts, enables whispering and barge-in by supervisors, displays RAG-sourced resource cards and action buttons, and exposes a plugin surface for custom scripts and disposition workflows, thereby permitting blended human+AI handling of inbound queries.

In one embodiment herein, telephony and edge components support direct integration with PBX/CCaaS providers and edge media gateways; the telephony gateway accepts SIP, WebRTC, and cloud telephony streams (for example, Twilio, Avaya, and Session Border Controller/SBC streams), performs media bridging, and forwards RTP/WebRTC audio to the streaming ingest layer for real-time transcription and analysis, thereby reducing media hops and preserving low end-to-end latency. In one embodiment herein, a streaming ingest layer accepts audio and event streams from browser and telephony endpoints (via WebRTC or gRPC), publishes raw and partially transcribed payloads to an internal messaging fabric, and applies preprocessing such as noise suppression, VAD (voice activity detection), and partial-hypothesis emission so downstream modules can operate on incremental results to shorten perceived response times.

In one embodiment herein, an event bus (for example, Kafka, Redpanda, or NATS) provides durable, partitioned publish/subscribe channels between ingestion, real-time AI modules, orchestration, and analytics; the event bus supports backpressure, exactly-once or at-least-once delivery semantics as required, and is used to route session events, action requests, telemetry traces, and durable workflow messages across the distributed system. In one embodiment herein, the real-time AI pipeline comprises an automatic speech recognition (ASR) service (for example, Whisper, Deepgram, or a cloud ASR) that generates transcriptions and phoneme alignment data, a real-time natural language understanding (RT-NLU) module that performs intent classification, entity extraction, sentiment and urgency detection, and risk scoring; and a policy and compliance engine that applies dynamic text changes, banned-topic rules, and jurisdictional constraints prior to response generation, thereby preventing disallowed outputs from reaching the user or being recorded.

In one embodiment herein, the system 100 implements a RAG Orchestrator, which receives the classified query and persona context, issues hybrid retrieval queries to the knowledge index (keyword+vector), assembles top-ranked passages into a grounding bundle with source metadata, and invokes the response generator module 118 with an instruction to strictly cite or quote from the provided passages when producing the natural language output; the RAG orchestrator also returns citation metadata used by the frontend to construct source cards and user-facing links.

In one embodiment herein, audio and text responses produced by the response generator module are passed to the TTS synthesis module 120 that produces waveform output and phoneme/viseme timing metadata; the phoneme timing is consumed by an avatar renderer (for example, a real-time avatar SDK) to produce lip-synced video frames and coordinated hand and face gestures, which are streamed or served to the browser alongside audio playback to achieve synchronized multimodal rendering. In one embodiment herein, serverless orchestration (for example, Azure Functions and Durable Functions) is used for stateless request handling, tool invocation (bookings, emails, and calendars), and long-running steps; durable orchestrations manage multi-step workflows such as scheduled callbacks, multi-stage escalations, and human escalation handoffs while persisting state and audit logs for review and retry in case of failure.

In one embodiment herein, the system 100 provides enterprise connectors to CRM, EHR/EMR, ITSM, geo-services, and messaging channels (email, SMS, WhatsApp). These integrations are invoked via secure API gateways using scoped credentials, and auditable actions such as lead creation, resume delivery, appointment booking, or ticket updates are logged with correlation identifiers so they can be traced back to a conversational session. In one embodiment herein, the knowledge and indexing layer includes, but not limited to, a KB ingestor that consumes heterogeneous sources (website HTML, PDFs, SharePoint, Confluence, one-off documents, and structured APIs), normalizes content (HTML clean text/Markdown, OCR for scanned PDFs), segments into token-bounded chunks with overlap, attaches metadata (source URL, timestamp, persona visibility), and writes both keyword fields and vector embeddings (for example, text-embedding models into a vector store such as pgvector or an industry vector DB) so that hybrid retrieval is possible at query time.

In one embodiment herein, an evaluation and improvement stack continuously assess system quality and model health using an auto-QA scorer (comparing generated answers to ground truth or retrieved passages), coaching and benchmarking dashboards for human reviewers, model monitoring for drift and latency anomalies, lexicon and ontology managers for controlled vocabularies, and a feedback loop that curates high-value session segments for supervised retraining or prompt updates. In one embodiment herein, the data layer comprises an OLTP store (for example, PostgreSQL with partitioning and row-level security for session metadata and user profiles), object storage (for media, transcripts, and artifacts), and a metrics/logs/tracing stack (Open Telemetry Grafana/ELK/Azure monitor) for observability; sensitive fields are masked or tokenized, and retention rules are enforced automatically by the ingest pipeline to comply with privacy policies.

In one embodiment herein, an agent assist orchestrator provides compact, context-sensitive assistance to human agents by producing next-best-response suggestions, annotated cues, policy reminders, and single-click actions (e.g., copy-to-email, open case study) surfaced in the user desktop; the orchestrator reconciles multiple signals, including real-time transcript, RAG results, and routing context, to prioritize suggestions for agent review. In one embodiment herein, a routing engine implements skill-based, priority, proximity, and urgency routing decisions for incoming sessions; the routing engine consults agent availability, persona requirements, and contextual urgency to determine whether a session should be handled by a fully automated agent, a hybrid human+AI agent, or a fully human operator, and it emits routing decisions as events on the event bus for the client to enact.

In one embodiment herein, an agentic orchestration framework controls LLMs as tools: an agent-orchestrator mediates tool calls (calendar, search, CRM), enforces guardrails, validates tool outputs, and composes multi-step plans (for example, gather resume, parse, populate ATS, and schedule interview), with each tool invocation recorded for audit and rollback. In one embodiment herein, platform and operations components include, but not limited to, identity and access management (OIDC/SAML integration, Azure AD), SCIM provisioning for tenant users, a secrets and key management system (KMS) layer for API keys and vaulted credentials, feature flagging for runtime capability toggles, continuous integration and continuous delivery (CI/CD) pipelines for safe deployment, zero-trust mutual transport layer security (mTLS) and role-based access control (RBAC)/attribute-based access control (ABAC) controls, and an audit/security information and event management pipeline (SIEM) pipeline for tamper-evident logs; these components provide enterprise governance and enable safe multi-tenant operations.

In one embodiment herein, the system 100 enforces privacy and compliance by capturing explicit user consent prior to voice capture, masking PII in logs, applying jurisdictional retention rules (for example, retention of transcripts for a configurable retention period), and providing an administrative interface for legal holds, redaction requests, and export of session records for compliance review. In one embodiment herein, the architecture is designed for low latency and resiliency, partial STT hypotheses and token streaming to the LLM reduce perceived response time; the event bus partitions and replicates session streams for throughput and fault tolerance; durable orchestrations handle retries and long-running tasks; and autoscaling compute groups ensure elasticity under load, thereby producing measurable technical improvements in latency, throughput, and availability over prior art conversational systems.

Figure 3B:
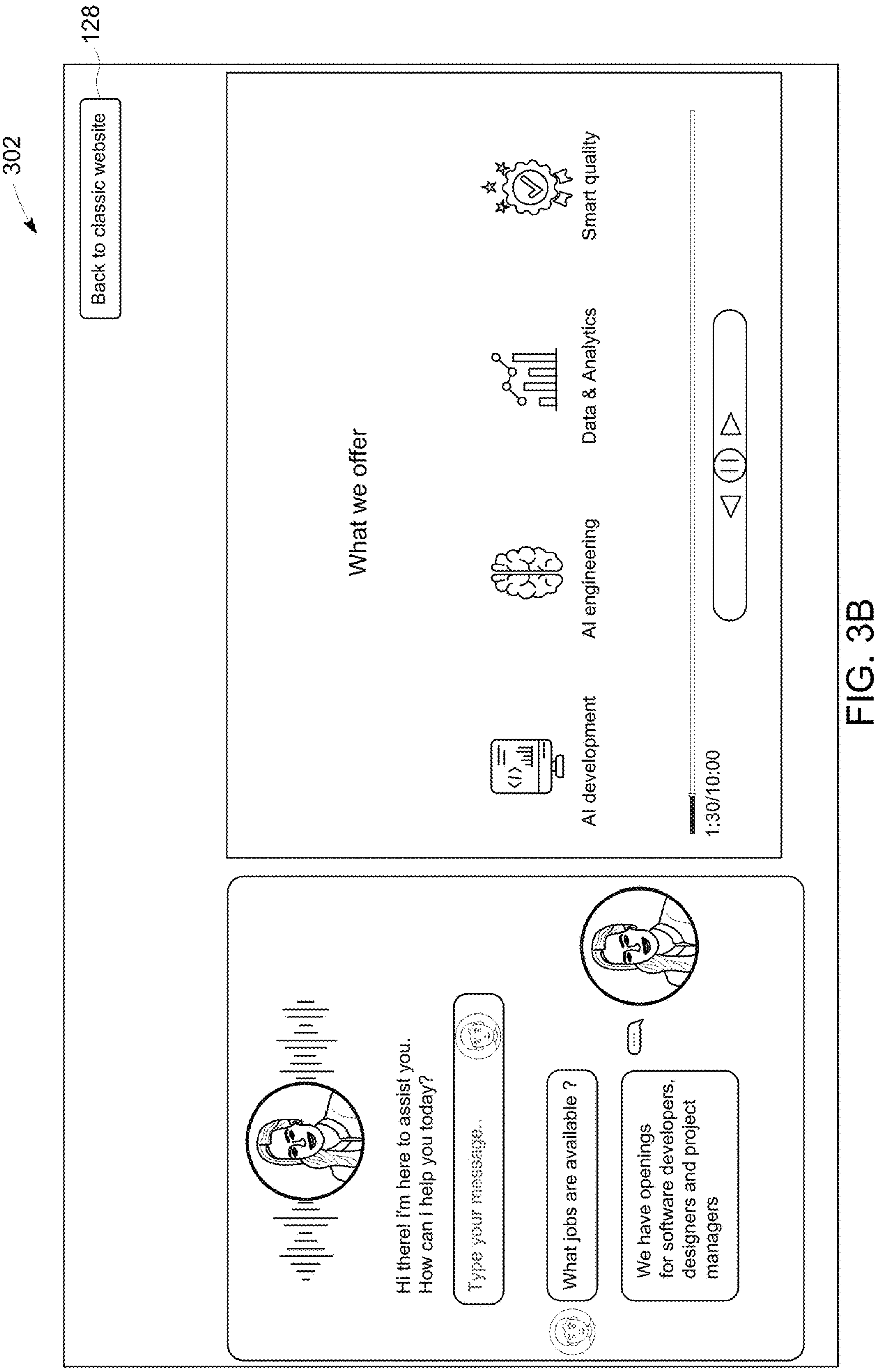
FIG. 3B illustrates a screenshot depicting the dual-panel conversational interface conversational interface of the system where the user interacts with the AI assistant without activating the microphone, in accordance with embodiments of the invention.

FIG. 3B refers to a screenshot 302 depicting the dual-panel conversational interface of the system 100 where the user interacts with the AI assistant without activating the microphone. The screenshot 302 illustrates a split-panel layout. On the left panel, a chat window is displayed with the AI avatar at the top, accompanied by a waveform graphic indicating conversational readiness. Beneath the avatar, a text-entry field is provided with the placeholder "Type your message . . . " allowing the user to manually enter queries. Example conversation exchanges are shown, including the user's typed query "What jobs are available?" and the AI assistant's response, "We have openings for software developers, designers, and project managers."

In one embodiment herein, the text-input chat interface is configured to cooperate with the input module 112 to capture typed messages, bypassing the microphone capture when speech input is not available or preferred. The typed query is transmitted directly to the NLP module 114 for processing, intent classification, and entity extraction. The AI assistant's generated response is rendered back into the chat window as a text bubble, synchronized with the avatar's expressions and gestures. The avatar, configured by the persona adaptation module 116, maintains empathetic facial cues and professional demeanor, ensuring continuity of user engagement even without spoken input.

In one embodiment herein, the right panel of the screenshot 302 simultaneously displays contextual website content under the section labeled "What we offer." This section includes categorized offerings such as AI Development, AI Engineering, Data and Analytics, and Smart Quality, accompanied by visual icons. A media control bar is displayed beneath the categories, thereby allowing playback of explanatory video content corresponding to the offerings. The video panel enables the system 100 to present supplemental multimedia resources while maintaining the conversation on the left panel.

In one embodiment herein, the output rendering module 124 integrates multi-modal outputs by displaying both the conversational transcript and the contextual content panel within the same interface. The dual-panel design ensures that users who cannot or choose not to use speech interaction can continue to engage through text-based queries, while simultaneously accessing relevant website information and video playback. A toggle option labeled "Back to classic website" is positioned at the top-right corner of the interface, thereby enabling users to revert to conventional navigation as needed.

In one embodiment herein, the screenshot 302 exemplifies how the system 100 flexibly accommodates users in scenarios where microphone input is unavailable or impractical. By offering a seamless text-chat channel alongside synchronized avatar responses and contextual video playback, the interface reduces barriers to engagement and ensures accessibility, while still guiding users into the conversation-first interaction workflow of the system 100.

In one exemplary embodiment, the conversational interface of the system 100 is configured for scenarios where the user is unable to type and relies exclusively on microphone-based inputs. The interface displays the avatar persona prominently at the center, surrounded by an animated waveform graphic that visually indicates readiness to capture voice input. A microphone icon is overlaid below the avatar, which when activated initiates continuous or push-to-talk audio capture. The user's spoken queries are transmitted to the speech-to-text module 115, which applies transcription, normalization, and segmentation, aligning the audio with phoneme markers for accurate recognition. The NLP module 114 processes the transcribed text to identify intent, extract entities, and generate a contextual response. The response generator module 118 produces structured outputs, which are converted back into speech by the text-to-speech module 120. The avatar generation module 122 synchronizes lip movements, gestures, and facial expressions with the generated audio, while the output rendering module 124 displays the assistant's spoken reply along with a transcript, thereby enabling a fully voice-driven conversational experience without reliance on typing.

In some embodiment herein, the user can initiate the conversation with the avatar, configured by the persona adaptation module 116, by at least one of text inputs and audio inputs. During the course of the conversation, the system 100 is further configured to permit seamless switching of input modalities, such that the user can discontinue manual typing and instead activate the microphone icon to provide subsequent audio inputs through speech. The speech-to-text module 115 then processes the captured audio inputs, performing transcription, normalization, and segmentation before forwarding the converted text to the NLP module 114 for continuation of the same conversational context. The user interface thereby maintains session continuity across both input modalities, ensuring that transitions between text and voice channels do not disrupt the conversational flow. This multi-modal flexibility allows users to adapt their mode of interaction based on situational convenience, accessibility requirements, or personal preference.

Figure 4:
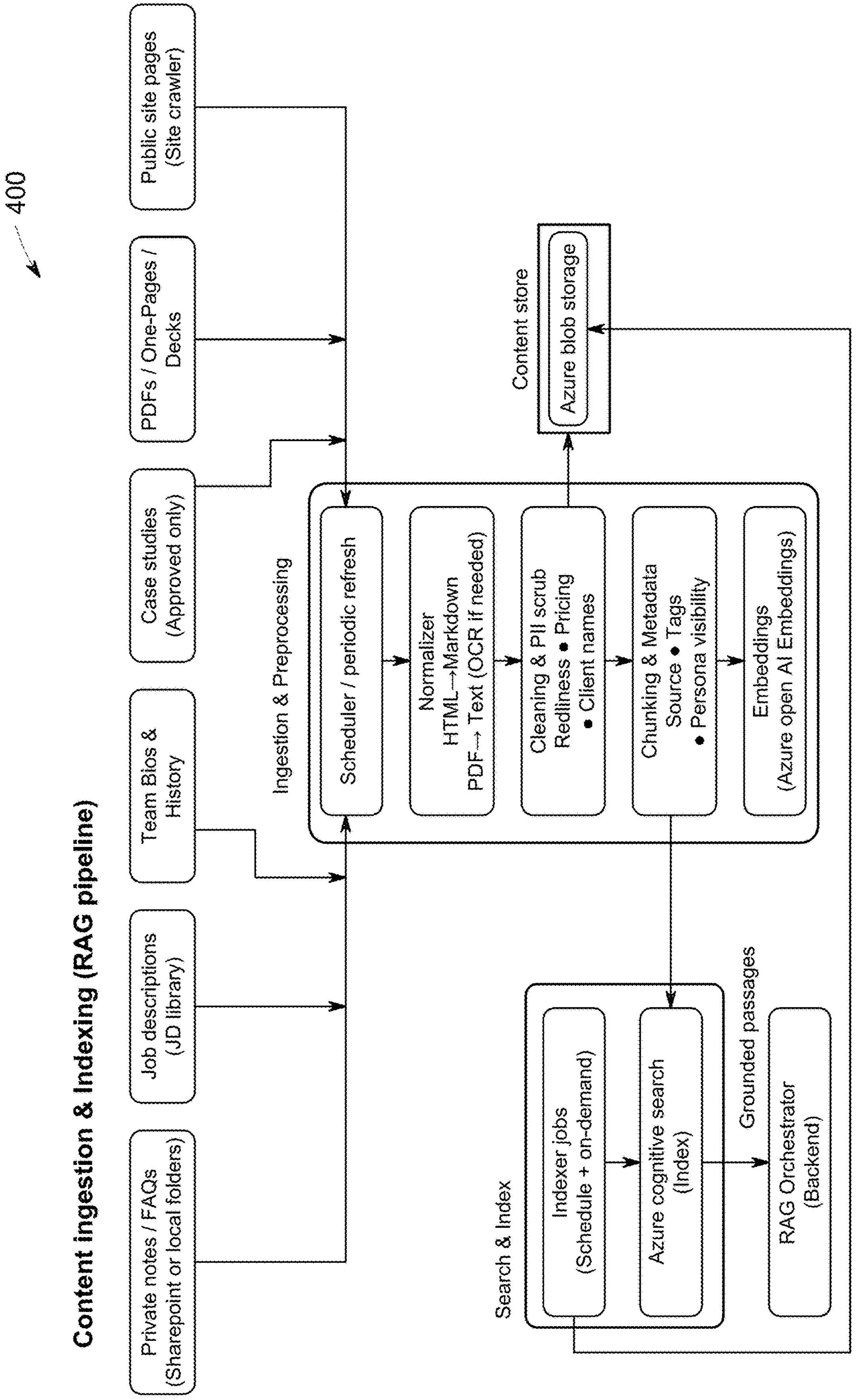
FIG. 4 illustrates a retrieval-augmented generation (RAG) pipeline architecture diagram, depicting content normalization, cleaning, segmentation, embedding generation, semantic search, and contextual response assembly, in accordance with embodiments of the invention.

FIG. 4 refers to a retrieval-augmented generation (RAG) pipeline architecture diagram 400, depicting content normalization, cleaning, segmentation, embedding generation, semantic search, and contextual response assembly. The RAG pipeline architecture diagram 400 is configured to ingest heterogeneous content formats, normalize them into structured text, and index them for semantic retrieval during query resolution. In one embodiment herein, the processor 104 is configured to receive content from multiple sources, which include, but not limited to, static webpages, HTML documents, PDF files, Markdown files, and third-party data repositories. The RAG pipeline architecture diagram 400 comprises scheduler or periodic refresh module that is configured to periodically trigger re-ingestion of source data at predefined intervals or upon detection of update events, thereby ensuring that the normalization and subsequent processing stages operate on the most current content. The ingestion pipeline applies a normalization module to unify the heterogeneous formats into a structured and consistent text representation. In one embodiment herein, the processor 104 is configured to execute content cleaning operations on the normalized text. The cleaning operations include, but not limited to, personal identifiable information (PII) scrubbing, removal of redundant formatting or track text changes, and enrichment with supplemental metadata. The metadata fields include, but not limited to, document source, timestamps, role-based visibility, and compliance annotations.

In one embodiment herein, the normalized and cleaned text is segmented into metadata-tagged chunks. Each chunk is assigned tags that specify its semantic boundaries, contextual labels, and persona relevance. The segmentation enables efficient retrieval and modular reuse of passages during contextual query answering. In one embodiment herein, the processor 104 is configured to generate semantic embeddings for the metadata-tagged chunks using a domain-optimized embedding model. The embeddings capture contextual similarity between queries and content passages. The embeddings are indexed in a vector database to enable high-dimensional similarity search during runtime.

In one embodiment herein, the processor 104 is configured to enforce compliance policies throughout the ingestion process. Compliance enforcement includes, but not limited to, anonymization of sensitive identifiers, recording of user consent, and automatic purging of stored chunks and embeddings after a configurable retention period. The compliance layer ensures adherence to privacy regulations such as GDPR and HIPAA. In one embodiment herein, when a user query is analyzed by the NLP module 114, the retrieval interface performs a semantic similarity search across the indexed embeddings. The retrieval interface identifies top-ranked passages and merges them into a unified response dataset. The dataset is then transmitted to the response generation module 118, which integrates it into the final natural language output.

In one embodiment herein, the RAG pipeline architecture diagram 400 is integrated with runtime telemetry. The telemetry records query-to-passage mappings, retrieval accuracy metrics, and embedding drift patterns. The telemetry data is ingested into the analytics pipeline for funnel and cohort analysis, enabling iterative improvements in passage segmentation, embedding models, and retrieval thresholds.

In one embodiment herein, the RAG pipeline architecture diagram 400 thus enables the system to ground generated responses in authoritative website content while preserving compliance and observability. The pipeline ensures that every conversational output is contextually relevant, semantically aligned, and traceable to its underlying source passages, thereby overcoming the limitations of conventional chatbots that rely on static scripted responses or ungrounded generative models.

Figure 5:
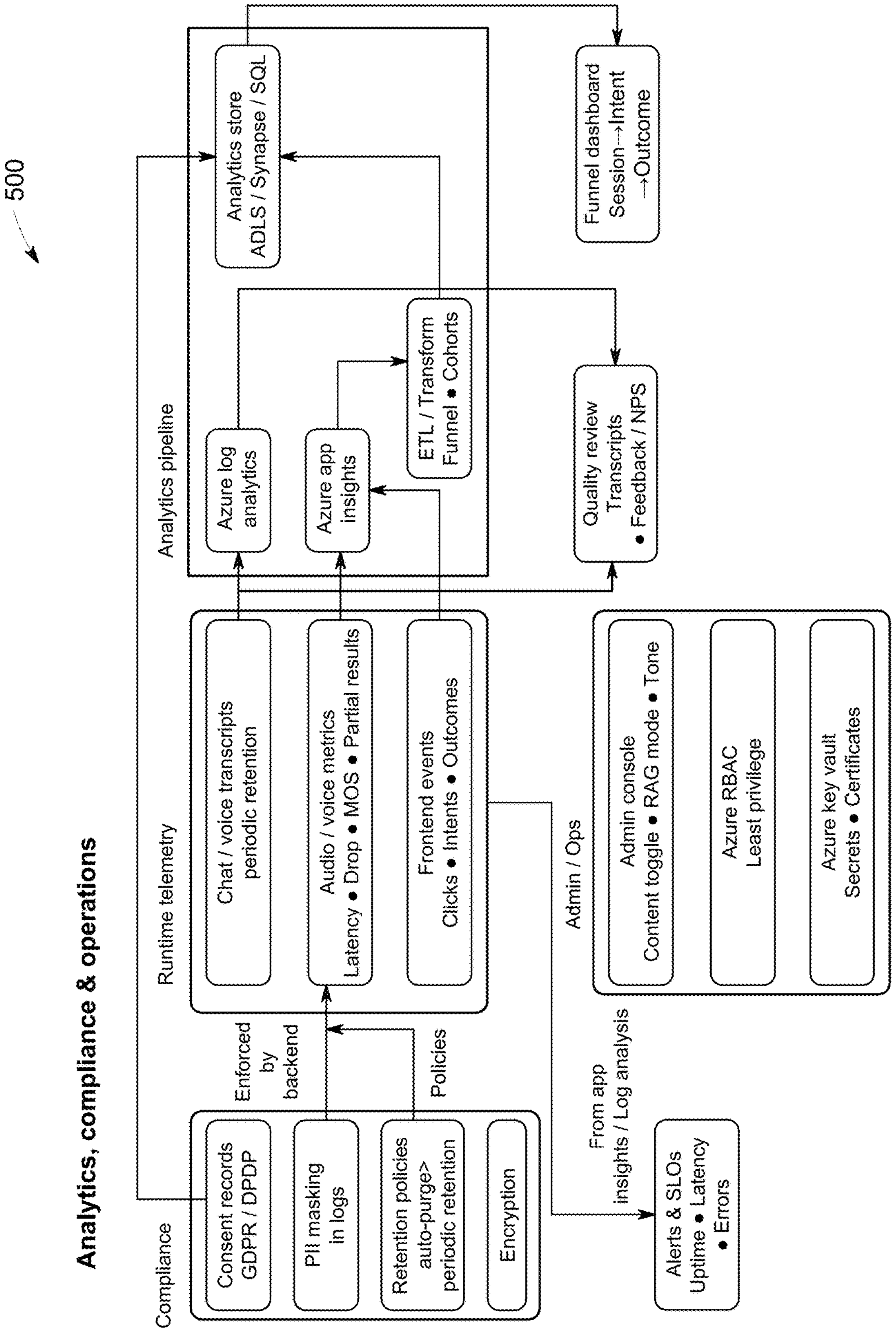
FIG. 5 illustrates an analytics, compliance, and operations architecture diagram, showing telemetry capture, data pipelines, compliance enforcement, security orchestration, and integration with enterprise platforms, in accordance with embodiments of the invention.

FIG. 5 refers to an analytics, compliance, and operations architecture diagram 500, showing telemetry capture, data pipelines, compliance enforcement, security orchestration, and integration with enterprise platforms. The architecture diagram 500 enables regulatory compliance, runtime observability, and adaptive performance optimization. In one embodiment herein, the processor 104 is configured to enforce compliance policies across the conversational workflow. The compliance policies include, but not limited to, recording user consent at query initiation, masking or redacting sensitive data fields during processing, and enforcing jurisdiction-specific data retention limits. In one embodiment herein, the processor 104 is configured to automatically purge expired data and embeddings after a configurable retention period, thereby ensuring alignment with privacy regulations such as GDPR and HIPAA. In one embodiment herein, the processor 104 is configured to apply encryption to all retained and in-transit data using role-based keys and secure key management protocols, thereby safeguarding sensitive information against unauthorized access during storage and transmission.

In one embodiment herein, the processor 104 is configured to orchestrate identity and security management using authentication modules, access tokens, and a secrets vault for securing API keys and sensitive credentials. Feature flagging is applied to selectively enable or disable experimental conversational capabilities, thereby ensuring safe deployment within enterprise environments. In one embodiment herein, runtime telemetry is captured for each session of conversational interaction. The telemetry comprises chat transcripts, audio metrics, response latencies, error codes, and frontend user events. The telemetry stream is published to an event bus, which coordinates asynchronous communication between conversational modules, including the speech-to-text module 115, the NLP module 114, the text-to-speech synthesis module 120, and the avatar generation module 122.

In one embodiment herein, the telemetry stream is ingested into an analytics pipeline. The analytics pipeline is configured with log aggregation modules, data transformation modules, and application insights dashboards. The pipeline supports funnel analysis to measure user drop-off points, cohort analysis to segment user groups, and performance benchmarking to evaluate latency and accuracy of responses. In one embodiment herein, a quality review subsystem is configured to analyze conversation transcripts and compute response quality metrics. The quality review subsystem incorporates user feedback scoring, intent-resolution accuracy benchmarking, and automated bias detection. The insights generated are fed back into the prompting strategies of the response generation module 118 to improve system performance iteratively.

In one embodiment herein, the processor 104 is configured to integrate with enterprise backends, which include, but not limited to, customer relationship management (CRM) systems, electronic health record (EHR/HL7) databases, IT service management (ITSM) platforms, and geolocation services. The integration enables cross-domain workflows, such as appointment scheduling, customer ticket resolution, or clinical query handling. In one embodiment herein, the analytics and compliance architecture diagram 500 dynamically adapts to detected user domains. The processor 104 modifies compliance rules, persona selection, and conversational tone when operating in regulated industries such as healthcare, recruitment, financial services, education, financial services, e-commerce, legal advisory, government services, technical support, industrial operations, entertainment, and thereof. The analytics, compliance, and operational architecture diagram 500 therefore ensure that the system not only generates contextually grounded conversational outputs but also meets enterprise-grade requirements for security, regulatory compliance, runtime observability, and continuous performance optimization, thereby overcoming the limitations of conventional chatbot platforms that lack monitoring, governance, and adaptation mechanisms.

Figure 6:
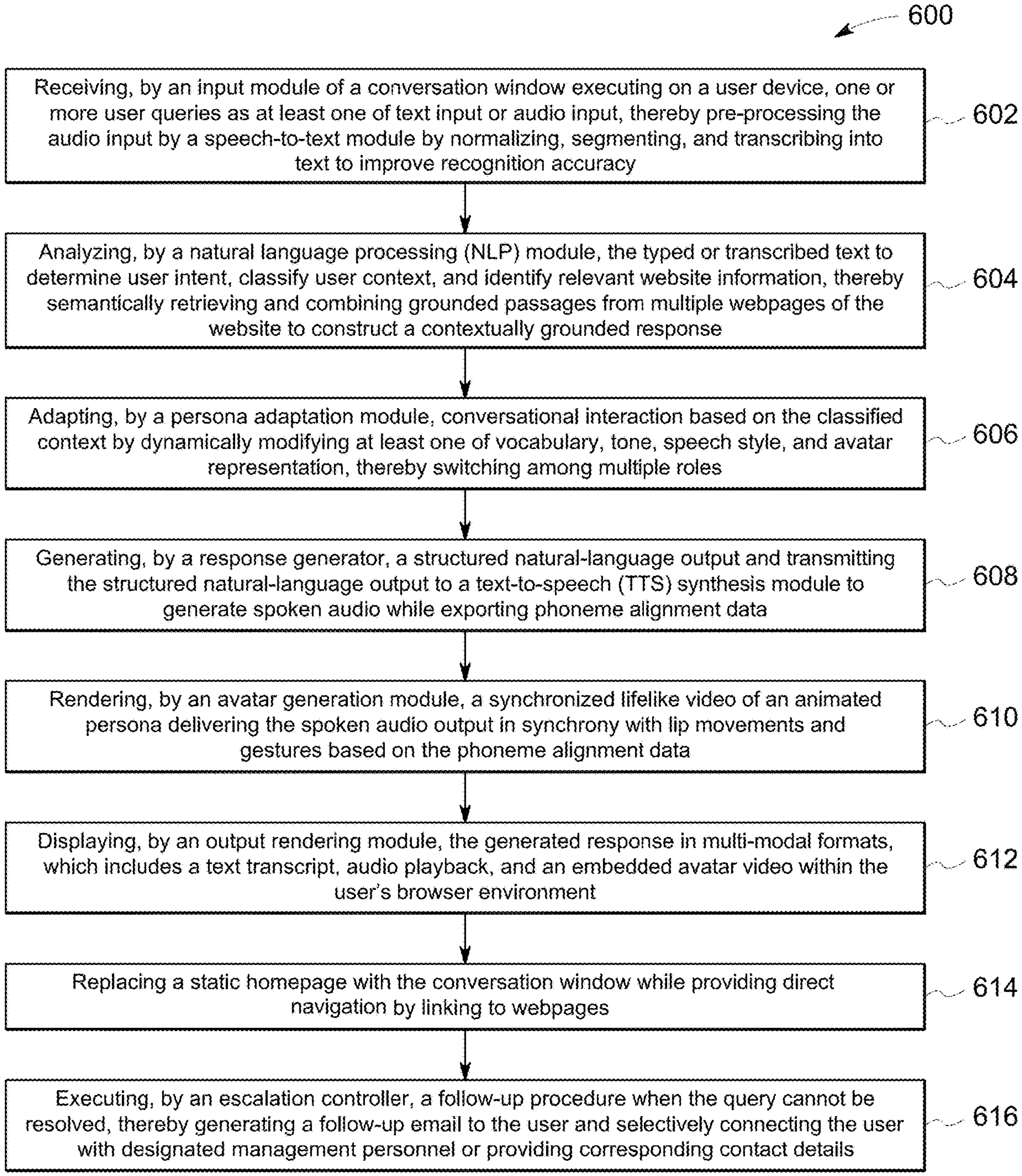
FIG. 6 illustrates a flowchart of a method for transforming a static website into an artificial intelligence (AI)-enabled multi-modal conversational agent using the system, in accordance with embodiments of the invention.

FIG. 6 refers to a flowchart 600 of a method for transforming a static website into an artificial intelligence (AI)-enabled multi-modal conversational agent using the system 100. First, at step 602, the input module 112 of the conversation window executing on the user device receives one or more user queries as at least one of the text inputs and the audio inputs, thereby pre-processing the audio input by the speech-to-text module 115 by normalizing, segmenting, and transcribing into text to improve recognition accuracy. The speech-to-text module is configured to transcribe audio input into text and generate phoneme alignment data for synchronizing avatar lip, facial, and gesture movements during video rendering.

At step 604, the natural language processing (NLP) module 114 analyzes the typed or transcribed text to determine user intent, classify user context, and identify relevant website information, thereby semantically retrieving and combining the grounded passages from the multiple webpages of the website to construct the contextually grounded response. The grounded passages are retrieved by performing a semantic similarity search across multiple webpages of the website and merged into a unified response dataset. At step 606, the persona adaptation module 116 adapts conversational interaction based on the classified context by dynamically modifying at least one of the vocabulary, tone, speech style, and avatar representation, thereby switching among multiple roles. The persona adaptation module 116 is configured to select the conversational persona from plurality of roles comprises at least one of, but not limited to, the sales assistant persona, the recruiter persona, the teacher persona, the healthcare assistant persona, a financial advisor persona, a customer support persona, a legal advisor persona, a technical support persona, a government service agent persona, an e-commerce shopping guide persona, an entertainment/media host persona, and a compliance trainer persona.

At step 608, the response generator module 118 generates structured natural-language output and transmits the structured natural-language output to the text-to-speech (TTS) synthesis module 120 to generate spoken audio while exporting phoneme alignment data. The response generator module 118 is configured to produce navigation actions that link the user directly to specific website sections, which include, but not limited to, the case studies, product descriptions, or job postings. At step 610, the avatar generation module 122 renders the synchronized lifelike video of an animated persona delivering the spoken audio output in synchrony with lip movements and gestures based on the phoneme alignment data. The avatar generation module 122 is configured to apply phoneme-to-viseme mapping to animate lip, facial, and gesture movements of the avatar synchronously with the generated audio.

At step 612, the output rendering module 124 displays the generated response in multi-modal formats, which include, but not limited to, the text transcript, the audio playback, and the embedded avatar video within the user's browser environment. The output rendering module 124 is configured to simultaneously display the natural-language answer as text and play back the synchronized avatar video in a split-screen conversation window. The output rendering module 124 is configured to replace the homepage dynamically without reloading the entire website and preserves access to the classic website via a persistent hyperlink. At step 614, the static homepage is replaced with the conversation window while providing direct navigation by linking to webpages, which include, but not limited to, case studies, product descriptions, application forms, service catalogs, pricing pages, user manuals, knowledge-base articles, policy documents, FAQs, training modules, multimedia content pages, customer testimonials, blog posts, career pages, and contact and support pages.

Further at step 616, the escalation module 126 executes the follow-up procedure when the query cannot be resolved, thereby generating the follow-up email to the user and selectively connecting the user with designated management personnel or providing corresponding contact details. The escalation module 126 is configured to transmit follow-up emails through an automated mail server and logs unresolved queries in a management dashboard for review by designated personnel. The escalation module 126 provides real-time connection to the designated personnel through at least one of chat forwarding, voice call initiation, or calendar-based appointment scheduling.

In another exemplary embodiment, a non-transitory computer-readable medium stores instructions that, when executed by the processor 104, cause the processor 104 to perform a method for transforming a static website into an artificial intelligence (AI)-enabled multi-modal conversational agent using the system 100. Initially, the processor 104 is configured to receive the one or more user queries through the conversation window executing on the user device as at least one of the text inputs and the audio inputs, thereby pre-processing the audio input by performing normalizing, segmenting, and transcribing into text to improve recognition accuracy.

Next, the processor 104 is configured to analyze the typed or transcribed text to determine user intent, classify user context, and identify relevant website information, thereby semantically retrieving and combining the grounded passages from the multiple webpages of the website to construct the contextually grounded response. Next, the processor 104 is configured to adapt the conversational interaction based on the classified context by dynamically modifying at least one of the vocabulary, tone, speech style, and avatar representation, thereby switching among multiple roles. Next, the processor 104 is configured to generate the structured natural-language output and transmit the structured natural-language output to generate the spoken audio while exporting phoneme alignment data. Next, the processor 104 is configured to render the synchronized lifelike video of the animated persona delivering the spoken audio output in synchrony with lip movements and gestures based on the phoneme alignment data.

Next, the processor 104 is configured to display the generated response in multi-modal formats, which include, but not limited to, the text transcript, audio playback, and the embedded avatar video within the user's browser environment. Next, the processor 104 is configured to replace the static homepage with the conversation window while providing direct navigation by linking to webpages, which include, but not limited to, the case studies, the product descriptions, the application forms, service catalogs, pricing pages, user manuals, knowledge-base articles, policy documents, FAQs, training modules, multimedia content pages, customer testimonials, blog posts, career pages, and contact and support pages. Finally, the processor 104 is configured to execute the follow-up procedure when the query cannot be resolved, thereby generating the follow-up email to the user and selectively connecting the user with designated management personnel or providing corresponding contact details.

In one embodiment herein, the system 100 provides a technical objective of transforming static websites into dynamic, AI-enabled multi-modal conversational platforms by integrating natural language understanding, retrieval-augmented generation, and persona adaptation. The system 100 is configured to enable seamless interpretation of user queries in both text and speech formats, thereby overcoming limitations of conventional static menus and rigid chatbot flows. In one embodiment herein, the system 100 supports synchronized avatar-based video responses with hand gestures and lip-synced speech, allowing users to receive information in an interactive and human-like manner.

In one embodiment herein, the system 100 is designed to address technical challenges in real-time response accuracy by leveraging a retrieval-augmented generation (RAG) pipeline that normalizes heterogeneous content formats, segments them into semantic embeddings, and indexes them for efficient retrieval. The system 100 ensures improved contextual accuracy of answers by grounding generative model outputs with domain-specific website content. In another embodiment herein, the system 100 enforces compliance with enterprise data governance by performing content cleaning, PII scrubbing, and metadata tagging, ensuring safe and policy-compliant responses during live interactions.

In one embodiment herein, the system 100 provides a commercial objective of enabling enterprises to deliver personalized, domain-specific conversational experiences without requiring extensive manual configuration or scripted chatbot design. The system 100 is configured to adaptively switch personas among roles such as, but not limited to, a sales assistant, a recruiter, an educator, a healthcare professional, a financial advisor persona, a customer support persona, a legal advisor persona, a technical support persona, a government service agent persona, an e-commerce shopping guide persona, an entertainment/media host persona, and a compliance trainer persona, thereby expanding applicability across multiple verticals including e-commerce, HR recruitment, e-learning, and telehealth. In one embodiment herein, the system 100 allows organizations to dynamically replace static homepages with conversation-driven interfaces, resulting in increased user engagement, improved lead conversion, and reduced navigation complexity. In one embodiment herein, the system 100 addresses commercial needs of enterprises by integrating escalation workflows that ensure customer retention and satisfaction. When user queries cannot be resolved, the escalation module generates automated follow-up emails, logs unresolved requests into a management dashboard, and facilitates real-time connection to designated personnel. This ensures minimal drop-off in customer journeys, supports higher resolution rates, and strengthens trust in enterprise service offerings.

In one embodiment herein, the system 100 provides analytics-driven commercial insights by capturing runtime telemetry, including chat transcripts, audio quality, persona selection statistics, and navigation paths. These metrics are aggregated into an analytics pipeline for funnel analysis, user retention scoring, and performance benchmarking. Enterprises are enabled to optimize persona strategies, evaluate sales assistant versus educator modes, and refine customer interaction flows based on empirical usage data. In one embodiment herein, the system 100 is designed to offer a scalable and modular framework that integrates seamlessly with enterprise platforms, including CRM, ERP, EHR, ITSM, and geolocation systems. This allows organizations to leverage the AI conversational assistant as an extension of their existing workflows without costly re-architecting of IT infrastructure. Commercial objectives further include, but not limited to, reduction in support costs, accelerated onboarding, and enhanced compliance monitoring through centralized governance.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principles of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

It will readily be apparent that numerous modifications and alterations can be made to the processes described in the foregoing examples without departing from the principles underlying the invention, and all such modifications and alterations are intended to be embraced by this application.

The claimed invention is:

1. A system for transforming a website into an artificial intelligence (AI)-enabled multi-modal conversational platform, comprising:

a computing device having a processor and a memory storing one or more instructions executable by the processor, wherein the computing device includes a user interface having a conversation window configured to receive user input, and wherein the processor is in communication with a server hosting the website and with a database storing indexed content of webpages of the website via a network, wherein the processor is configured to execute the one or more instructions to:

receive one or more user queries via the conversation window, wherein the one or more user queries comprising at least one of text data or speech data;

when the one or more user queries include speech data, pre-process the speech data using a speech-to-text module by performing normalization, segmentation, and transcription of the speech data into text;

index content of webpages of the website to generate indexed website data;

analyze the text of the user query using a natural language processing (NLP) module to retrieve content from the indexed website data by performing semantic retrieval of content corresponding to the user query;

generate a contextually grounded response by combining retrieved content from multiple webpages of the website;

generate, by a response generator module, a structured natural-language output;

render, through an output rendering module integrated into the user interface, the structured natural-language output;

replace a static homepage of the website with the conversation window;

enable the user query to directly trigger navigation by displaying or linking to one or more relevant webpages of the website based on the retrieved indexed website data; and in response to a determination that the user query cannot be answered from the indexed website data, automatically generate and transmit, by an escalation module, a follow-up email to the user containing additional information and clarifications, and initiate further interaction by either connecting the user with designated personnel or providing corresponding contact details.

2. The system of claim 1, wherein the system comprises a persona adaptation module configured to adapt conversational interaction by dynamically modifying at least one of vocabulary, tone, speech style, or avatar representation, and to switch among multiple roles comprising at least one of a sales assistant, a recruiter, an educator, a healthcare professional, a financial advisor persona, a customer support persona, a legal advisor persona, a technical support persona, a government service agent persona, an e-commerce shopping guide persona, an entertainment/media host persona, and a compliance trainer persona, in response to the identified user context, wherein the processor is configured to transmit the structured natural language output to a text-to-speech (TTS) synthesis module to generate spoken audio output while exporting phoneme alignment data, wherein the processor is configured to generate synchronized video output using an avatar generation module based on the phoneme alignment data, wherein the avatar generation module produces a video of an animated avatar delivering the generated spoken audio output in synchrony with lip movements, wherein the structured natural-language output is rendered as a text transcript, an audio playback, and an avatar video, and wherein the relevant webpages within the website include at least one of case studies, product descriptions, application forms, service catalogs, pricing pages, user manuals, knowledge-base articles, policy documents, FAQs, training modules, multimedia content pages, customer testimonials, blog posts, career pages, and contact and support pages.

3. The system of claim 1, wherein the processor is configured to normalize heterogeneous content formats comprising hypertext markup language (HTML), portable document format (PDF), and Markdown into structured text for uniform processing, wherein the processor is further configured to:

perform content cleaning operations, which include personal identifiable information (PII) scrubbing, track text changes, and metadata enrichment prior to indexing;

segment normalized content into metadata-tagged chunks, wherein the metadata-tagged chunks comprise at least one of a source, tags, or persona visibility;

generate vector embeddings of the segmented content using a semantic embedding model, and index the embeddings for retrieval-augmented generation (RAG);

enforce compliance policies by recording user consent, masking sensitive data in logs, and automatically purging stored content after a configurable retention period; and capture runtime telemetry, which include chat transcripts, audio or voice metrics, and frontend user events for performance and usage analytics.

4. The system of claim 1, wherein the processor is configured to transmit telemetry data into an analytics pipeline, which include log aggregation, application insights, and data transformation modules for funnel and cohort analysis.

5. The system of claim 1, wherein the processor is configured to perform quality review operations, which include transcript analysis, user feedback scoring, and automated benchmarking of response accuracy to update prompting strategies.

6. The system of claim 1, wherein the processor is configured to integrate with enterprise platforms, which include customer relationship management (CRM), electronic health record (EHR/HL7), IT service management (ITSM), and geolocation services.

7. The system of claim 1, wherein the processor is configured to dynamically adapt compliance rules, persona selection, and conversational tone based on detected user domain, which include healthcare, recruitment, customer service, education, financial services, e-commerce, legal advisory, government services, technical support, industrial operations, and entertainment.

8. The system of claim 1, wherein the processor is configured to orchestrate secure operations using identity management, secrets vault, and feature flagging for enabling or disabling selected conversational capabilities.

9. The system of claim 1, wherein the processor is configured to maintain an event bus for orchestrating asynchronous communication between the speech-to-text module, natural language understanding module, text-to-speech module, and avatar video generator.

10. A method for transforming a static website into an artificial intelligence (AI)-enabled multi-modal conversational agent, comprising:

receiving, via a conversation window of a user interface, one or more user queries as text input or speech input;

when the one or more user queries include speech input, pre-processing the speech input using a speech-to-text module by normalizing, segmenting, and transcribing the speech input into text;

indexing content of webpages of the website to generate indexed website data;

analyzing the text of the user query using a natural language processing (NLP) module to retrieve relevant content from the indexed website data by performing semantic retrieval of content corresponding to the user query;

generating a contextually grounded response by combining retrieved content from multiple webpages of the website;

generating, by a response generator module, a structured natural-language output and transmitting the structured natural-language output to a text-to-speech (TTS) synthesis module to generate spoken audio while exporting phoneme alignment data;

rendering, by an avatar generation module, a synchronized video of an animated avatar based on the phoneme alignment data;

displaying, by an output rendering module, the generated response as text, audio, and avatar video in the user interface;

replacing a static homepage with the conversation window and enabling the user query to directly trigger navigation to relevant webpages of the website based on the retrieved indexed website data; and in response to determining that the user query cannot be answered from the indexed website data, automatically generating and transmitting, by an escalation module, a follow-up email to the user containing additional information or clarifications, and initiating further interaction by either connecting the user with designated personnel or providing corresponding contact details.

11. The method of claim 10, wherein the speech-to-text module is configured to transcribe audio input into text and generate phoneme alignment data for synchronizing avatar lip, facial, and gesture movements during video rendering.

12. The method of claim 10, wherein the system comprises a persona adaptation module configured to adapt conversational interaction by dynamically modifying at least one of vocabulary, tone, speech style, or avatar representation, and select a conversational persona from a plurality of roles comprising at least one of a sales assistant persona, a recruiter persona, a teacher persona, a healthcare assistant persona, a financial advisor persona, a customer support persona, a legal advisor persona, a technical support persona, a government service agent persona, an e-commerce shopping guide persona, an entertainment/media host persona, and a compliance trainer persona.

13. The method of claim 10, wherein the grounded passages are retrieved by performing semantic similarity search across multiple webpages of the website and merged into a unified response dataset.

14. The method of claim 10, wherein the response generator module is configured to produce navigation actions that link the user directly to specific website sections, which include case studies, product descriptions, application forms, service catalogs, pricing pages, user manuals, knowledge-base articles, policy documents, FAQs, training modules, multimedia content pages, customer testimonials, blog posts, career pages, and contact and support pages or job postings.

15. The method of claim 10, wherein the avatar generation module is configured to apply phoneme-to-viseme mapping to animate lip, facial, and gesture movements of the avatar synchronously with the generated audio.

16. The method of claim 10, wherein the output rendering module is configured to simultaneously displays the natural-language answer as text and plays back the synchronized avatar video in a split-screen conversation window.

17. The method of claim 10, wherein the output rendering module is configured to replace the homepage dynamically without reloading the entire website and preserves access to the classic website via a persistent hyperlink.

18. The method of claim 10, wherein the escalation module is configured to transmit follow-up emails through an automated mail server and logs unresolved queries in a management dashboard for review by designated personnel, and wherein the escalation module provides real-time connection to the designated personnel through at least one of chat forwarding, voice call initiation, or calendar-based appointment scheduling.

19. A non-transitory computer-readable medium storing instructions that, when executed by a processor, cause the processor to perform a method for transforming a static website into an artificial intelligence (AI)-enabled multimodal conversational agent, the method comprising:

receiving, through a conversation window of a user interface executing on a user device, one or more user queries as text input or speech input;

when the one or more user queries include speech input, pre-processing the speech input using a speech-to-text module by normalizing, segmenting, and transcribing the speech input into text;

indexing content of webpages of the website to generate indexed website data;

analyzing the text of the user query using a natural language processing (NLP) module to retrieve relevant content from the indexed website data by performing semantic retrieval of content corresponding to the user query;

generating a contextually grounded response by combining retrieved content from multiple webpages of the website;

generating a structured natural-language output and transmitting the structured natural-language output to a text-to-speech (TTS) synthesis module to generate spoken audio while exporting phoneme alignment data;

rendering a synchronized video of an animated avatar based on the phoneme alignment data;

displaying the generated response as text, audio, and avatar video in the user interface;

replacing a static homepage with the conversation window and enabling the user query to directly trigger navigation to relevant webpages of the website based on the retrieved indexed website data; and in response to determining that the user query cannot be answered from the indexed website data, generating and transmitting a follow-up email to the user containing additional information or clarifications, and initiating further interaction by either connecting the user with designated personnel or providing corresponding contact details.

* * * * *